US012477156B2

(12) United States Patent
Zhang et al.

(10) Patent No.: US 12,477,156 B2
(45) Date of Patent: Nov. 18, 2025

(54) METHOD FOR ENCODING AND DECODING, ENCODER, AND DECODER

(71) Applicants: Beijing Xiaomi Mobile Software Co., Ltd., Beijing (CN); Xidian University, Shaanxi (CN)

(72) Inventors: Wei Zhang, Shaanxi (CN); Mary-Luc Georges Henry Champel, Beijing (CN)

(73) Assignees: Beijing Xiaomi Mobile Software Co., Ltd., Beijing (CN); Xidian University, Xi'an (CN)

( * ) Notice: Subject to any disclaimer, the term of this patent is extended or adjusted under 35 U.S.C. 154(b) by 439 days.

(21) Appl. No.: 18/000,919

(22) PCT Filed: Jun. 24, 2020

(86) PCT No.: PCT/CN2020/098267
§ 371 (c)(1),
(2) Date: Dec. 6, 2022

(87) PCT Pub. No.: WO2021/258373
PCT Pub. Date: Dec. 30, 2021

(65) Prior Publication Data
US 2023/0224506 A1 Jul. 13, 2023

(51) Int. Cl.
*H04N 19/96* (2014.01)
*G06T 7/10* (2017.01)
(Continued)

(52) U.S. Cl.
CPC .............. *H04N 19/96* (2014.11); *G06T 7/10* (2017.01); *H04N 19/184* (2014.11); *H04N 19/91* (2014.11); *G06T 2207/10028* (2013.01)

(58) Field of Classification Search
CPC ... G06T 2207/10028; G06T 7/10; G06T 9/40; H04N 19/184; H04N 19/91; H04N 19/96
See application file for complete search history.

(56) References Cited

U.S. PATENT DOCUMENTS 10,223,810 B2   3/2019  Chou et al.
10,674,165 B2 *  6/2020  Panusopone ........... H04N 19/63
(Continued)

FOREIGN PATENT DOCUMENTS

CA   3096452 A1   10/2019
CA   3103454 A1   12/2019
(Continued)

OTHER PUBLICATIONS

Intellectual Property India, Office Action Issued in Application No. 202247074337, Apr. 24, 2023, 5 pages.
(Continued)

*Primary Examiner* — Peter D Le
(74) *Attorney, Agent, or Firm* — Finnegan, Henderson, Farabow, Garrett & Dunner, L.L.P.

(57) ABSTRACT

A method for encoding a point cloud to generate a bitstream of compressed point cloud data is provided. The point cloud's geometry is represented by an octree-based structure with a plurality of nodes having parent-child relationships by recursively splitting a volumetric space containing the point cloud into sub-volumes each associated with a node of the octree-based structure. The method includes: determining a coding mode, wherein the coding mode includes a planar coding mode and an angular coding mode; obtaining coding context information for a present child node, entropy encoding the present child node based on the obtained coding context information to produce encoded data for the bitstream.

20 Claims, 12 Drawing Sheets

(51) Int. Cl.
*H04N 19/184* (2014.01)
*H04N 19/91* (2014.01)

(56) References Cited

U.S. PATENT DOCUMENTS

| | | | |
|---|---|---|---|
| 10,693,492 B1* | 6/2020 | Lasserre | H03M 7/40 |
| 10,694,210 B2 | 6/2020 | Chou et al. | |
| 11,483,363 B2 | 10/2022 | Hur et al. | |
| 11,563,984 B2 | 1/2023 | Zhang et al. | |
| 11,601,488 B2 | 3/2023 | Hur et al. | |
| 11,601,675 B2 | 3/2023 | Park et al. | |
| 11,611,775 B2 | 3/2023 | Gao et al. | |
| 11,615,557 B2 | 3/2023 | Flynn | |
| 11,620,768 B2 | 4/2023 | Flynn | |
| 11,676,310 B2 | 6/2023 | Huang et al. | |
| 11,711,545 B2 | 7/2023 | Zhang et al. | |
| 11,736,726 B2 | 8/2023 | Zhang et al. | |
| 11,750,839 B2 | 9/2023 | Zhang et al. | |
| 11,843,803 B2 | 12/2023 | Zhang et al. | |
| 11,895,307 B2 | 2/2024 | Mammou et al. | |
| 11,936,850 B2 | 3/2024 | Wan et al. | |
| 11,948,336 B2 | 4/2024 | Zhang et al. | |
| 12,010,341 B2 | 6/2024 | Oh et al. | |
| 12,069,316 B2 | 8/2024 | Oh et al. | |
| 12,087,023 B2 | 9/2024 | Sugio et al. | |
| 12,113,963 B2 | 10/2024 | Zhu | |
| 12,149,717 B2 | 11/2024 | Zhang et al. | |
| 12,165,368 B2 | 12/2024 | Oh et al. | |
| 12,167,032 B2 | 12/2024 | Sugio et al. | |
| 12,198,392 B2 | 1/2025 | Iguchi et al. | |
| 2014/0270476 A1 | 9/2014 | Cameron et al. | |
| 2017/0214943 A1 | 7/2017 | Cohen et al. | |
| 2017/0347100 A1 | 11/2017 | Chou et al. | |
| 2017/0347122 A1 | 11/2017 | Chou et al. | |
| 2019/0394496 A1 | 12/2019 | Tourapis et al. | |
| 2020/0021844 A1 | 1/2020 | Yea et al. | |
| 2020/0143568 A1 | 5/2020 | Lasserre et al. | |
| 2020/0396489 A1* | 12/2020 | Flynn | G06T 9/00 |
| 2020/0413080 A1* | 12/2020 | Lasserre | H04N 19/91 |
| 2021/0004992 A1 | 1/2021 | Flynn et al. | |
| 2021/0327099 A1* | 10/2021 | Van der Auwera | H04N 19/597 |
| 2022/0351423 A1* | 11/2022 | Martin-Cocher | H04N 19/597 |
| 2025/0063196 A1 | 2/2025 | Sugio et al. | |

FOREIGN PATENT DOCUMENTS

| | | |
|---|---|---|
| CN | 106846425 A | 6/2017 |
| CN | 110418135 A | 11/2019 |
| CN | 110572655 A | 12/2019 |
| CN | 110915219 A | 3/2020 |
| CN | 111145090 A | 5/2020 |
| CN | 111615791 A | 9/2020 |
| CN | 111615792 A | 9/2020 |
| CN | 111699697 A | 9/2020 |
| CN | 114503440 A | 5/2022 |
| EP | 3 514 967 A1 | 7/2019 |
| EP | 3 595 180 A1 | 1/2020 |
| JP | 2018101404 A | 6/2018 |
| JP | 2021528917 A | 10/2021 |
| JP | 2022504344 A | 1/2022 |
| RU | 2267161 C2 | 12/2005 |
| WO | WO 2017/209961 A1 | 12/2017 |
| WO | WO 2019/140508 A1 | 7/2019 |
| WO | WO 2019/140510 A1 | 7/2019 |
| WO | WO 2019/195922 A1 | 10/2019 |
| WO | 2020055865 A1 | 3/2020 |
| WO | WO 2020/072665 A1 | 4/2020 |
| WO | 2020189976 A1 | 9/2020 |

OTHER PUBLICATIONS

ISA State Intellectual Property Office of the People's Republic of China, Written Opinion of the International Searching Authority Issued in Application No. PCT/CN2020/098267, Nov. 11, 2020, WIPO, 6 pages.
ISA State Intellectual Property Office of the People's Republic of China, Written Opinion of the International Searching Authority Issued in Application No. PCT/CN2020/098272, Nov. 11, 2020, WIPO, 6 pages.
ISA State Intellectual Property Office of the People's Republic of China, Written Opinion of the International Searching Authority Issued in Application No. PCT/CN2020/119829, Jun. 29, 2021, WIPO, 5 pages.
Notice of Reasons for Refusal issued in Japanese Application No. 2022-578799, dated Aug. 10, 2023, 4 pages.
Notice about the results of checking the patentability of an invention issued in Russian Application No. 2022133674/28(073328), dated Aug. 8, 2023, 16 pages.
ISA State Intellectual Property Office of the People's Republic of China, International Search Report issued in Application No. PCT/CN2020/098272, Nov. 11, 2020, WIPO, 2 pages.
State Intellectual Property Office of the People's Republic of China, Office Action and Search Report issued in Application No. 202080003877.X, Nov. 3, 2021, 9 pages.
State Intellectual Property Office of the People's Republic of China, Office Action and Search Report issued in Application No. 202080003878.4, Nov. 3, 2021, 14 pages.
ISA State Intellectual Property Office of the People's Republic of China, International Search Report issued in Application No. PCT/CN2020/098267, Nov. 11, 2020, WIPO, 4 pages.
ISA State Intellectual Property Office of the People's Republic of China, International Search Report issued in Application No. PCT/CN2020/119829, Jun. 29, 2021, WIPO, 5 pages.
European Patent Office, Extended European Search Report Issued in Application No. 20196648.8, Mar. 1, 2021, 8 pages.
European Patent Office, Extended European Search Report Issued in Application No. 20196653.8, Mar. 1, 2021, 13 pages.
Ke Zhang et al., "Hierarchical Segmentation Based Point Cloud Attribute Compression" "2018 IEEE International Conference on Acoustics, Speech, and Signal Processing (ICASSP)", Dec. 31, 2018, 5 pages.
Eduardo Pavez et al., "Dynamic Polygon Cloud Compression" "IEEE", Mar. 5, 2017, 6 pages.
Sebastien Lasserre et al., "[GPCC] [CE 13.22 related] An improvement of the planar coding mode", "128.MPEG meeting No. m50642", Oct. 11, 2019, 3 pages.
Sebastien Lasserre et al., "[GPCC] Planar mode in octree-based geometry coding" "127.MPEG meeting No. m48906", Jul. 12, 2019, 33 pages.
Antoine Dricot et al., "Adaptive Multi-level Triangle Soup for Geometry-based Point Cloud Coding", "2019 IEE 21st International Workshop on Multimedia Signal Processing (MMSP)", Dec. 31, 2019, 6 pages.
Lasserre (Blackberry)S et al., "On an improvement of RAHT to exploit attribute correlation", "126.MPEG Meeting; Mar. 25, 2019-Mar. 29, 2019; Geneva; (Motion Picture Expert Group or ISO/IEC JTC1/SC29/WG11), No. m47378, XP030211360", Mar. 20, 2019, 28 pages.
3DG, "G-PCC codec description" "128.MPEG Meeting; Oct. 7, 2019-Oct. 11, 2019; Geneva; (Muiuinpicture Expert Group or ISO/IEC JTC1/SC29/WG11), No. n18891, XP030225589" Dec. 18, 2019, 74 pages.
Sebastien Lasserre et al., "Entropy coding an octree node occupancy depending on neighbour's child nodes (TM3)", "124.MPEG Macau, m44753", Oct. 2018, 29 pages.
Khaled Mammou et al., "Adaptive Distance-based Prediction in TMC3", "Apple Inc., ISO/IEC JTC1/SC29/WG11 MPEG2018/ m42642, San Diego, US", Apr. 2018, 3 pages.
European Patent Office, Office Action Issued in Application No. 20196648.8, Jan. 25, 2024, Germany, 5 pages.
European Patent Office, Office Action Issued in Application No. 20196653.8, Jan. 26, 2024, Germany, 7 pages.
Wei Zhang et al:"[G-PCC] [new proposal] Planar coding improvement", 130.MPEG Meeting; Apr. 20, 2020-Apr. 24, 2020; XP030287104, No. m53522, Apr. 23, 2020, 5 pages.

(56) References Cited

OTHER PUBLICATIONS

Japanese Patent Office, Office Action Issued in Application No. 2022-579816, Mar. 5, 2024, 9 pages. (Submitted with Machine Translation).

State Intellectual Property Office of the People's Republic of China, Office Action and Search Report Issued in Application No. 2022107881419, Mar. 29, 2024, 16 pages. (Submitted with Machine Translation).

The First Office Action issued by the State Intellectual Property Office of People's Republic of China on Jun. 6, 2025, in corresponding Application No. CN 202080017735.9, 8 pages.

Office Action issued by the Intellectual Property India on Mar. 27, 2025, in corresponding Application No. IN 202247074338, 7 pages.

Notice of Allowance issued by the U.S. Patent and Trademark Office on Mar. 12, 2025, in U.S. Appl. No. 18/001,992, 17 pages.

\* cited by examiner

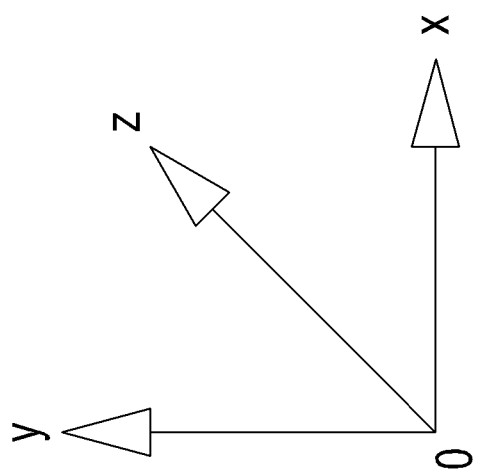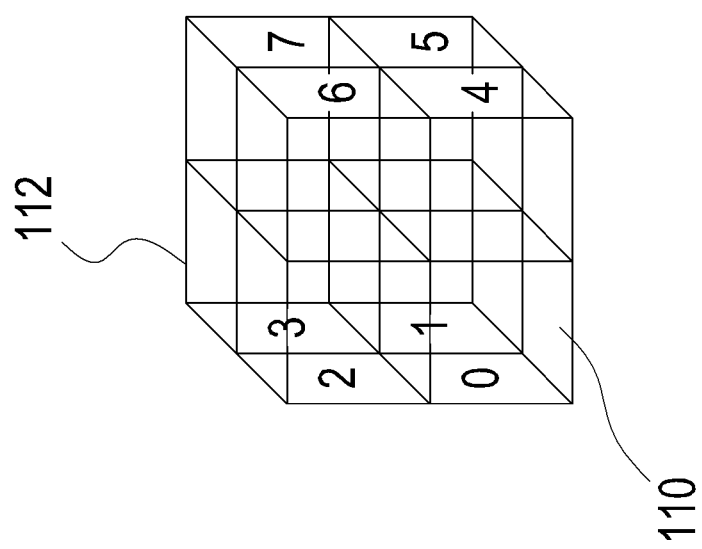
Fig. 4

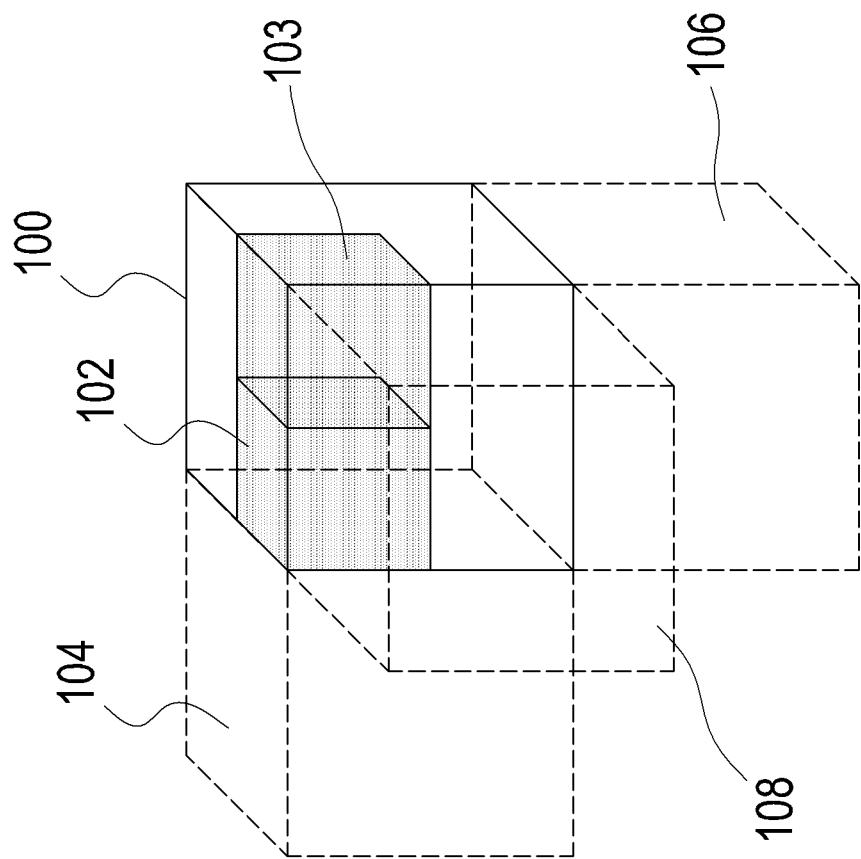
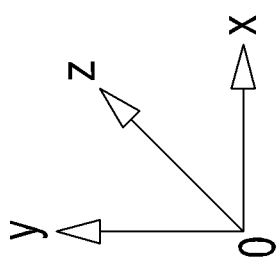
Fig. 5

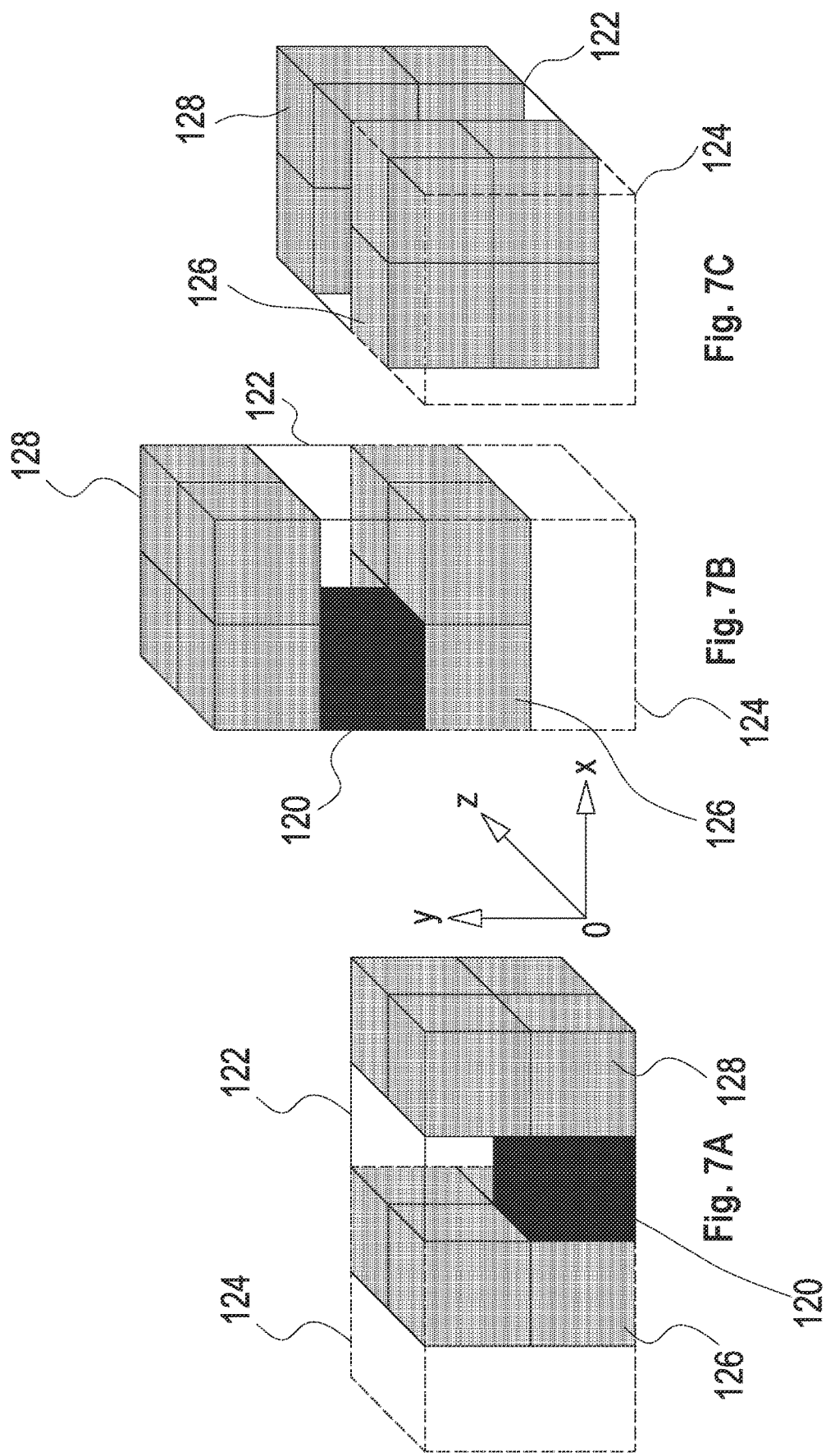

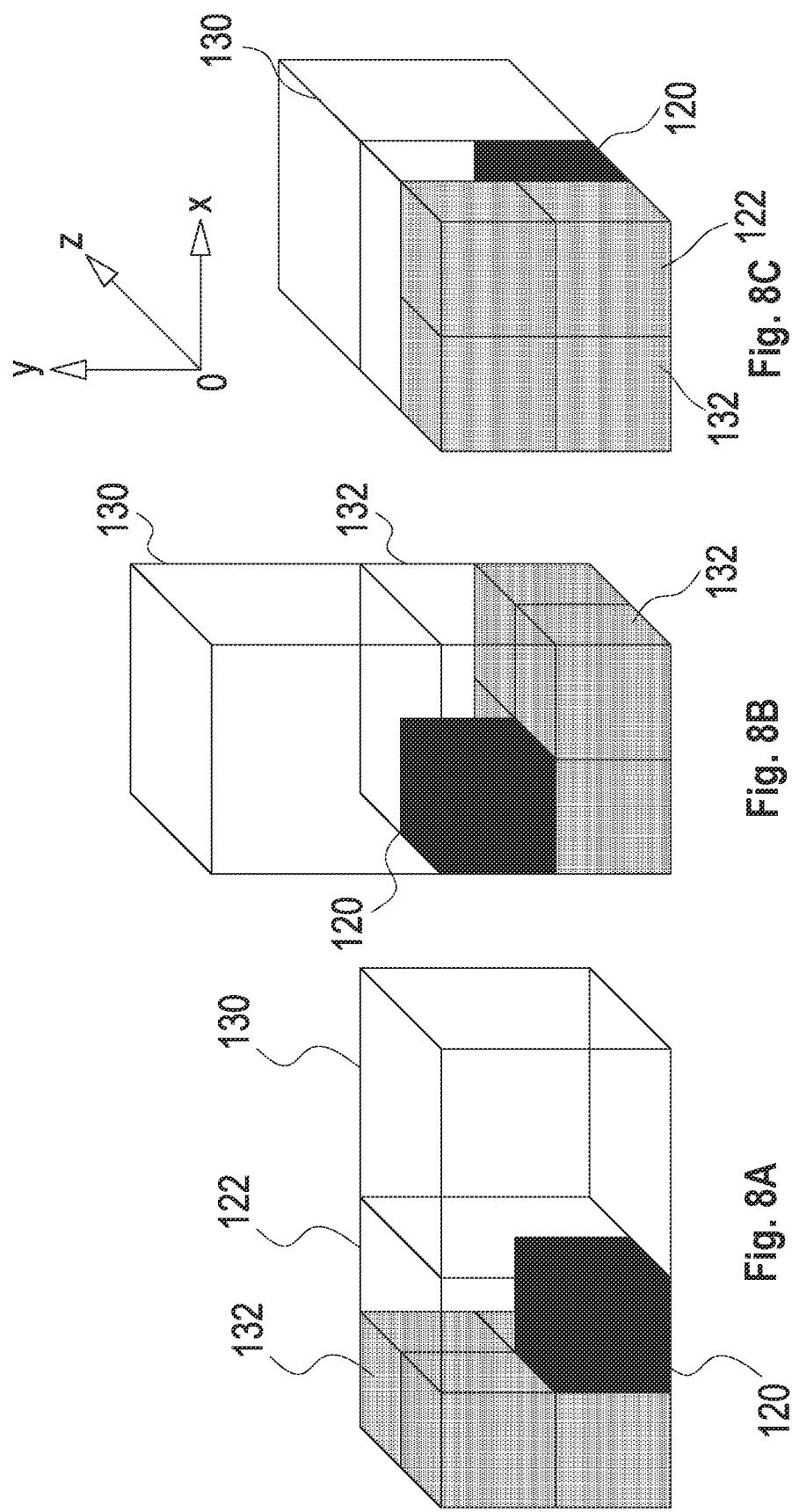

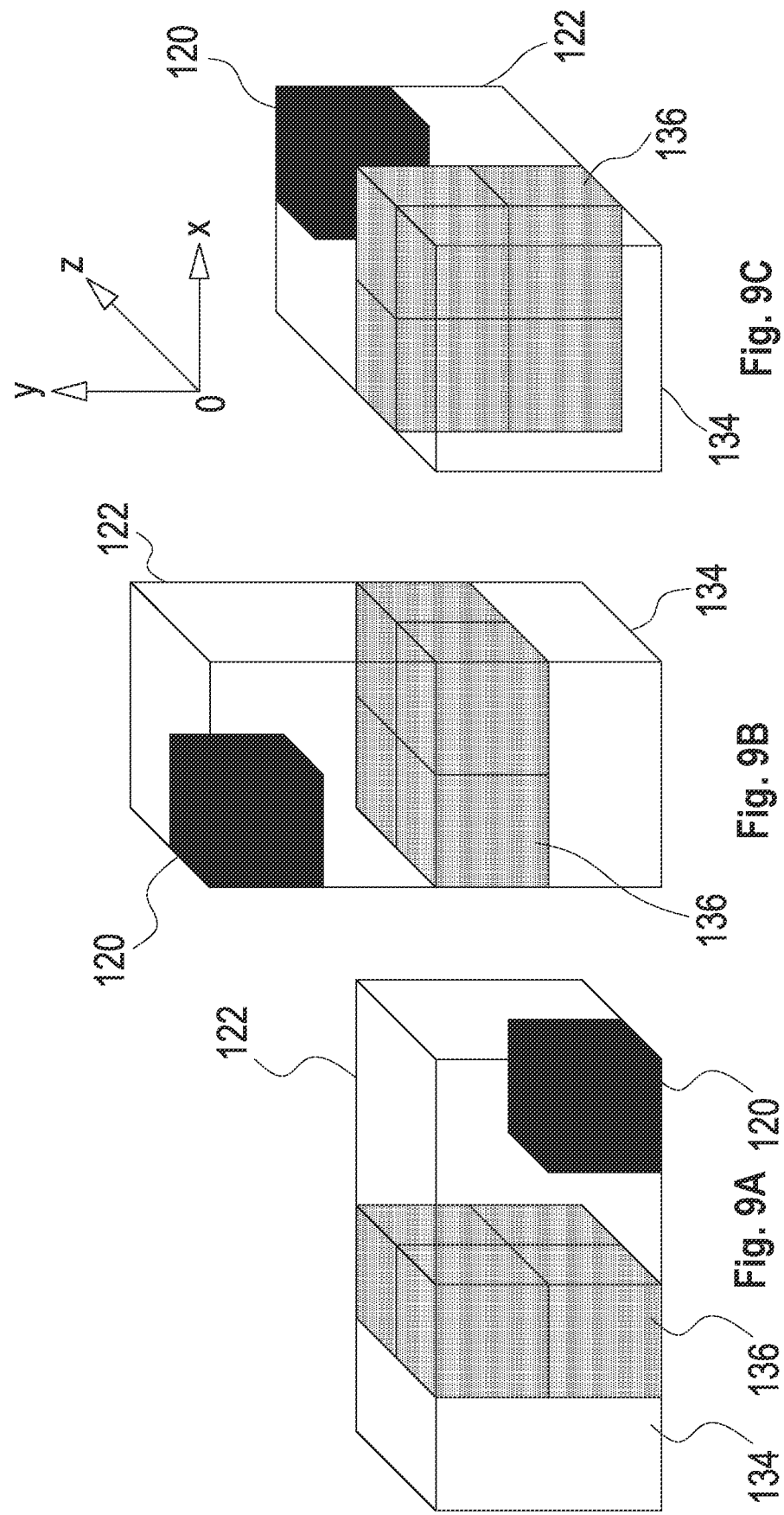

METHOD FOR ENCODING AND DECODING, ENCODER, AND DECODER

CROSS REFERENCE TO RELATED APPLICATIONS

This application is a U.S. national phase application of International Application No. PCT/CN 2020/098267, filed on Jun. 24, 2020, the entire content of which is hereby incorporated by reference in its entirety for all purposes.

FIELD

The present application generally relates to point cloud compression. Preferably, the present application relates to a method of encoding and decoding as well as an encoder and decoder for improved entropy coding of point clouds.

BACKGROUND

As an alternative to 3D meshes, 3D point clouds have recently emerged as a popular representation of 3D media information. Use cases associated with point cloud data are very diverse and include:
  3D assets in movie production,
  3D assets for real-time 3D immersive telepresence or VR applications,
  3D free viewpoint video (for instance for sports viewing),
  Geographical Information Systems (cartography),
  Culture heritage (storage of fragile assets in digital form),
  Autonomous driving (large scale 3D mapping of environment).

A point cloud is a set of points in a 3D space, each with associated attributes, e.g. color, material properties, etc. Point clouds can be used to reconstruct an object or a scene as a composition of such points. They can be captured using multiple cameras and depth sensors in various setups and may be made up of thousands up to billions of points in order to realistically represent reconstructed scenes.

For each points of a point cloud, its position (usually an X, Y, Z information coded as a floating point with 32 or 64 bits) and its attributes (usually at least an RGB color coded in 24 bits) need to be stored. With sometimes billions of points in a point cloud, one can easily understand that the raw data of a point cloud can be several Gigabytes of data: hence, there is a strong need for compression technologies so as to reduce the amount of data required to represent a point cloud.

Two different approaches were developed for point cloud compression:
  First, in the Video based Point Cloud Compression (VPCC) approach, a point cloud is compressed by performing multiple projections of it on the 3 different axis X, Y, Z and on different depths so that all points are present in one projected image. Then the projected images are processed into patches (to eliminate redundancy) and re-arranged into a final picture where additional metadata is used to translate pixels positions into point positions in space. The compression is then performed using traditional image/video MPEG encoders. The advantage of this approach is that it reuses existing coders and it naturally supports dynamic point clouds (using video coders) but this is hardly usable for scarce point clouds and it is expected that the compression gain would be higher with point clouds dedicated methods.
  Second, in the Geometry based Point Cloud Compression (GPCC) approach, points positions (usually referred to as the geometry) and points attributes (color, transparency . . . ) are coded separately. In order to code the geometry, an octree structure is used. The whole point cloud is fitted into a cube which is continuously split into eight sub-cubes until each of the sub-cubes contains only a single point. The position of the points is therefore replaced by a tree of occupancy information at every node. Since each cube has only 8 sub-cubes, 3 bits are enough to code the occupancy and therefore for a tree of depth D, $3^D$ bits are needed to code the position of a point. While this transformation alone is not enough to provide significant compression gain, it should be noted that since it is a tree, many points share the same node values and thanks to the use of entropy coders, the amount of information can be significantly reduced.

Understanding that many point clouds include surfaces, in the current design of GPCC, a planar coding mode was introduced to code such eligible nodes of the octree more efficiently.

Thus, a flag isPlanar is introduced, which indicates whether or not the occupied child nodes belong to a same horizontal plane. If isPlanar is true, then an extra bit planePosition is signaled to indicate whether the plane is the lower plane or the upper plane.

The isPlanar flag is coded by using a binary arithmetic coder with the 8 (2×2×2) bit context information as planar context information. Further, if the node is planar, the plane position information is coded by using a binary arithmetic coder with 24 (=2×3×2×2) bit context information as plane position context information.

Additionally, an angular coding mode was introduced to enhance planar coding mode using angular context for sparse point cloud data, where neighbor occupancy tends to be zero (i.e., empty) in most cases. More specifically, angular coding mode replaces the context information when coding planePosition with a reduced context information and the isPlanar flag is still arithmetically coded using the same context model as in planar coding mode.

However, in the current methods for encoding and decoding of point clouds, information of the neighboring nodes is not considered.

Thus, it is an object of the present invention to provide an encoding and decoding method as well as an encoder and decoder enabling improved quick and accurate data compression of point clouds.

SUMMARY

In an aspect of the present invention, a method for encoding a point cloud is provided to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, comprising the steps:
  Determining a coding mode, wherein the coding mode includes planar coding mode and angular coding mode;
  Obtaining coding context information for a present child node, wherein
    if the coding mode is the planar coding mode, coding context information includes planar context information, wherein planar context information of the present child node is determined according to the occupancy pattern of the present parent node and the occupancy pattern of at least one neighboring parent node positioned directly next to the present parent node;

if the coding mode is the angular coding mode, the coding context information of a present child node includes planar information of the present parent node and the occupancy of the vertical parent neighbor adjacent to the present parent node; and Entropy encoding the occupancy of the present child node based on the determined coding context information to produce encoded data for the bitstream.

Thus, initially the coding mode is determined. Depending on the coding mode, the context information is determined resulting in two different context information for efficient entropy encoding.

Therein, for the planar coding mode, the present parent and the neighboring parent node are on the same depth D of the tree. Due to their position, the present parent node and the neighboring parent node share a common surface. For the current child node, being a direct child of the present parent node at depth D+1 of the tree, the planar context information is determined in dependence on the occupancy pattern of the present parent node and the at least one neighboring parent node. Therein, the occupancy pattern includes the distribution of occupied child nodes within the respective parent node. Therein, the planar context information includes information about a possible plane or surface represented by the point cloud going through the current child node. Thus, information about the occupancy pattern of at least one direct neighbor of the present parent node is considered as context information for the entropy encoding.

For the angular coding mode, a more efficient planar context mode is implemented instead. Compared to the planar context information of the planar coding mode, only that information is considered which is accessible in sparsely populated cloud data.

As a consequence, more reliable predictions about occupancy of the current child node can be made which can be used for increased data reduction by the entropy encoder. In this manner, the complete tree is traversed to determine an occupancy for each node and provides sufficient context information for the entropy encoder.

Preferably, the neighboring parent node is the node directly next to the present child node, sharing one surface with the present child node.

Preferably, for the planar coding mode, coding context information includes planar context information, wherein the only planar context information of the present child node is determined according to the occupancy pattern of the present parent node and the occupancy pattern of at least one neighboring parent node positioned directly next to the present parent node.

Preferably, for the angular coding mode, the coding context information of a present child node consist of planar information of the present parent node and the occupancy of the vertical parent neighbor adjacent to the present parent node.

Preferably, if the coding mode is the planar coding mode, the coding context information includes plane position context information, wherein the plane position context information includes one or more of:

The distance d from the closest already coded node at the same coordinate in the respective parent node and the same depth D in the octree-based structure;

The plane position of the closest already coded node at the same coordinate in the respective parent node and the same depth D in the octree-based structure; and The plane position of the present child node according to the occupancy pattern of at least one neighboring parent node positioned next to the present parent node.

Therein, in particular, the distance d is discretized into the values "near", "not too far" and "far". If the already coded node at the same coordinate and depth D exists at all, then also the plane position, i.e. "high" or "low", may be included to the plane position context information. Therein, the coordinate of the child node is the relative position within the respective parent node. Further, the plane position may be included into the plane position context information according to the occupancy pattern of at least one neighboring parent node positioned next to the present parent node. In particular, the plane position context information includes more than one or all of the above-mentioned information. In particular, in the planar coding mode, the plane position context information may consist of the above-mentioned information.

Preferably, if the closest already coded node at the same coordinate in the respective parent node and the same depth D in the octree-based structure is non-existent, then the plane position context information only includes the plane position of the present child node according to the occupancy pattern of at least one neighboring parent node positioned directly next to the present parent node. Thus, the plane position context information is determined in this case alone from the information gathered from the neighboring nodes. No further information is accessible and therefore used. But due to including the information from the neighboring nodes, efficient compression is feasible even in this case. In particular, the axisIdx-statement identifying the axis normal to the plane for coding planePosition proposed in the present GPCC specification is replaced by the context information determined from the occupancy of the neighboring nodes.

Preferably, if the coding mode is the angular coding mode and the present child node is not eligible for angular coding mode, the coding context information includes plane position context information, wherein the plane position context information includes one or more of:

The distance d from the closest already node at the same coordinate in the respective parent node and the same depth D in the octree-based structure;

The plane position of the closest already coded node at the same coordinate in the respective parent node and the same depth d in the octree-based structure; and The plane position of the present child node according to the occupancy pattern of at least one neighboring parent node positioned directly next to the present parent node.

Thus, in this case, the plane position context information can be identical to the plane position information in the planar coding mode. In particular, the plane position context information includes more than one or all of the above-mentioned information. In particular, in the angular coding mode, if the present child node is not eligible for the angular coding mode, the plane position context information may consist of the above-mentioned information.

Preferably, for determining the planar context information and the plane position context information according to the occupancy pattern of at least one neighboring node, a present plane position of the present child node relative to the present parent node is determined, wherein the present plane position includes high plane position and low plane position. Therein, for a certain geometrical axis under consideration, going along the axis through the parent node, if there is first a plane of child nodes in the present parent node perpendicular to the axis including the present child node, then the present plane position is low plane position. If there is first a plane of child nodes in the present parent node perpendicular to the axis without the present child node, the present plane position is high plane position. Thus, the present plane position is determined for the planar context information in the planar coding mode, as well as part of the plane position context information in the plana coding mode and the angular coding mode.

Preferably, if the present plane position is low plane position, the planar context information and plane position context information is determined according to an occupancy of a first group of four child nodes of the neighboring parent node that are directly next to the present parent node and the occupancy of a second group of four child nodes of the present parent node directly opposite the first group. In other words, the four child nodes of the first group of the neighboring parent node are directly adjacent to the common surface of the present parent node and the neighboring parent node and the second group is within the present parent node arranged directly adjacent to the opposite side of the present parent node. Each of the groups preferably define a plane by the four child nodes, wherein each of the planes is perpendicular to the considered geometrical axis and directly adjacent to the present child node to be evaluated. Thus, sufficient information can be acquired to provide a reliable prediction about the likelihood of a plane in the present child node and the likelihood of its position.

Preferably, for the present plane position being at low plane position, if at least one child node of the first group is occupied and the second group is not occupied, the planar context information includes the likelihood of a plane and the plane position context information includes the likelihood of a low plane position.

Preferably, for the present plane position being at low plane position, if the first group is not occupied and at least one child node of the second group is occupied, the planar context information includes the likelihood of a plane and the plane position context information includes the likelihood of a high plane position.

Preferably, for the present plane position being at low plane position, if the first group is not occupied and the second group is not occupied, the planar context information includes the likelihood of a plane, wherein the plane position context information includes the likelihood of a low plane, if at least one or more child nodes in the neighboring parent node are occupied which do not belong to the first group and "UNKNOWN" otherwise.

Preferably, for the present plane position being at low plane position, if at least one child node of the first group is occupied and at least one child node of the second group is occupied and #FirstGroup>#SecondGroup+1, the planar context information includes the likelihood of a plane and the plane position context information includes the likelihood of a low plane position, wherein #FirstGroup indicates the number of occupied nodes in the first group and #SecondGroup indicates the number of occupied nodes in the second group.

Preferably, for the present plane position being at low plane position, if at least one child node of the first group is occupied and at least one child node of the second group is occupied and #FirstGroup<#SecondGroup+1, the planar context information includes the likelihood of a plane and the plane position context information includes the likelihood of a high plane position, wherein #FirstGroup indicates the number of occupied nodes in the first group and #SecondGroup indicates the number of occupied nodes in the second group.

Preferably, if the present plane position is high, the planar context information and plane position context information is determined according to an occupancy pattern of the neighboring parent node that is along the axis under consideration directly after the present parent node, and the occupancy of a group of four child nodes of the present parent node in a plane directly perpendicular to the axis under consideration and next to the present child node. In other words, the occupancy of the child nodes of the neighboring parent node directly adjacent to (i.e after) the common surface of the present parent node are unknown due to the decoding order. Thus, the occupancy of the neighboring parent node itself, sharing a common surface with the present child node is used together with a group within the present parent node arranged directly adjacent to the opposite side of the present child node, i.e. opposite to the neighboring parent node (i.e before in the coding/decoding order). Thus, the group of child nodes does not include the present child node to be coded. Therein, the group preferably defines a plane by the four child nodes, wherein the plane is perpendicular to the considered geometrical axis and directly adjacent to the present child node to be evaluated within the present parent node. Thus, sufficient information can be acquired to provide a reliable prediction about the likelihood of a plane in the present child node and the likelihood of its position.

Preferably, for the present plane position being at high plane position, if at least one child node of the group is occupied and the neighboring parent node is not occupied, the planar context information includes the likelihood of a plane and the plane position context information includes the likelihood of a low plane position.

Preferably, for the present plane position being at high plane position, if the group is not occupied and the neighboring parent node is occupied, the planar context information includes the likelihood of a plane and the plane position context information includes the likelihood of a high plane position.

Preferably, for the present plane position being at high plane position, if the group is not occupied and the neighboring parent node is not occupied, the planar context information includes the likelihood of a plane, wherein the plane position context information includes the likelihood of a low plane, if at least one or more child nodes are occupied in a neighboring parent node along the axis under consideration directly before the present parent node and "UNKNOWN" otherwise.

Preferably, for the present plane position being at high plane position, if at least one child node of the group is occupied and the neighboring parent node is occupied and #Group>2, the planar context information includes the likelihood of a plane and the plane position context information includes the likelihood of a low plane position, wherein #Group indicates the number of occupied nodes in the group. Therein, it is assumed that statistically one child node in the neighboring parent node is occupied.

Preferably, for the present plane position being at high plane position, if at least one child node of the group is occupied and the neighboring parent node is occupied and #Group<2, the planar context information includes the likelihood of a plane and the plane position context information includes the likelihood of a high plane position, wherein #Group indicates the number of occupied nodes in the group.

Preferably, for the present plane position being at high plane position, if at least one child node of the group is occupied and the neighboring parent node is occupied and #Group=2, the planar context information includes the likelihood of the absence of a plane and the plane position is inferred to be unknown, wherein #Group indicates the number of occupied nodes in the group.

Preferably, the neighboring parent node is arranged along one of the geometrical axes. If planar context information is evaluated along one of the geometrical axes-X, Y, Z-then the neighboring parent node is arranged along this specific axis directly before or directly after the present parent node.

Preferably, the planar context information is determined along all three geometrical axes. Thus, planes or surfaces represented by the points of the point cloud are evaluated along each axis.

Preferably, the present parent node is arranged relatively to the neighboring parent node in order of decoding. During decoding, the nodes of the octree-based structure are successively evaluated. Thus, information about occupancy patterns in the order of decoding before the present parent node is already accessible and thus can be used for determining the planar context information for decoding. In particular, the order of decoding is exactly inverse to the order of encoding. However, during encoding, the exact position of each point in the point cloud is already known.

In an aspect of the present invention, a method for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, comprising the steps:

Determining a coding mode, wherein the coding mode includes Planar Coding Mode and Angular Coding Mode;

Obtaining coding context information for a present child node, wherein if the coding mode is the Planar Coding Mode, the coding context information includes planar context information, wherein planar context information of the present child node is determined according to the occupancy pattern of the present parent node and the occupancy pattern of at least one neighboring parent node positioned directly next to the present parent node;

if the coding mode is the Angular Coding Mode, the coding context information of a present child node includes planar information of the present parent node and the occupancy of the vertical parent neighbor adjacent to the present parent node; and Entropy decoding the bitstream based on the context information of the present child node to reconstruct the point cloud.

Therein, for the planar coding mode, the present parent and the neighboring parent node are on the same depth D of the tree. Due to their position, the present parent node and the neighboring parent node share a common surface. For the current child node, being a direct child of the present parent node at depth D+1 of the tree, the planar context information is determined in dependence on the occupancy pattern of the present parent node and the at least one neighboring parent node. Therein, the planar context information includes information about a possible plane or surface represented by the point cloud going through the current child node. Thus, information about the occupancy of at least one direct neighbor of the present parent node is considered as context information for the entropy encoding.

For the angular coding mode, a more efficient planar context mode is implemented instead. Compared to the planar context information of the plana coding mode, only that information is considered which is accessible in sparsely populated cloud data.

As a consequence, more reliable predictions about occupancy of the current child node can be made which can be used for increased data reduction by the entropy encoder. In this manner, the complete tree is traversed to determine an occupancy for each node and provides sufficient context information for the entropy encoder.

Preferably, the method of decoding is further built according to the features described above with respect to the method for encoding. These features can be freely combined with the method of decoding.

In an aspect of the present invention, an encoder is provided for encoding a point cloud to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, the encoder comprising:

a processor and a memory storage device, wherein in the memory storage device instructions executable by the processor are stored that, when executed, cause the processor to perform the method according to the above-described methods for encoding and decoding.

In an aspect of the present invention, a decoder is provided for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, the decoder comprising:

a processor and a memory storage device, wherein in the memory storage device instructions executable by the processor are stored that, when executed, cause the processor to perform the above-described method of decoding.

In an aspect of the present invention a non-transitory computer-readable storage medium is provided storing processor-executed instructions that, when executed by a processor, cause the processor to perform the above-described method of encoding and/or decoding.

BRIEF DESCRIPTION OF THE DRAWINGS

Reference will now be made, by way of example, to the accompanying drawings which show example embodiments of the present application, and in which the Figures show:

FIG. 4 numbering of the eight sub-nodes in each node,

FIG. 5 neighbors of a node with known occupancy information,

FIGS. 7A-7C detailed embodiment of the present invention,

FIGS. 8A-8C detailed embodiment of the present invention,

FIGS. 9A-9C detailed embodiment of the present invention,

DETAILED DESCRIPTION

Figure 1:
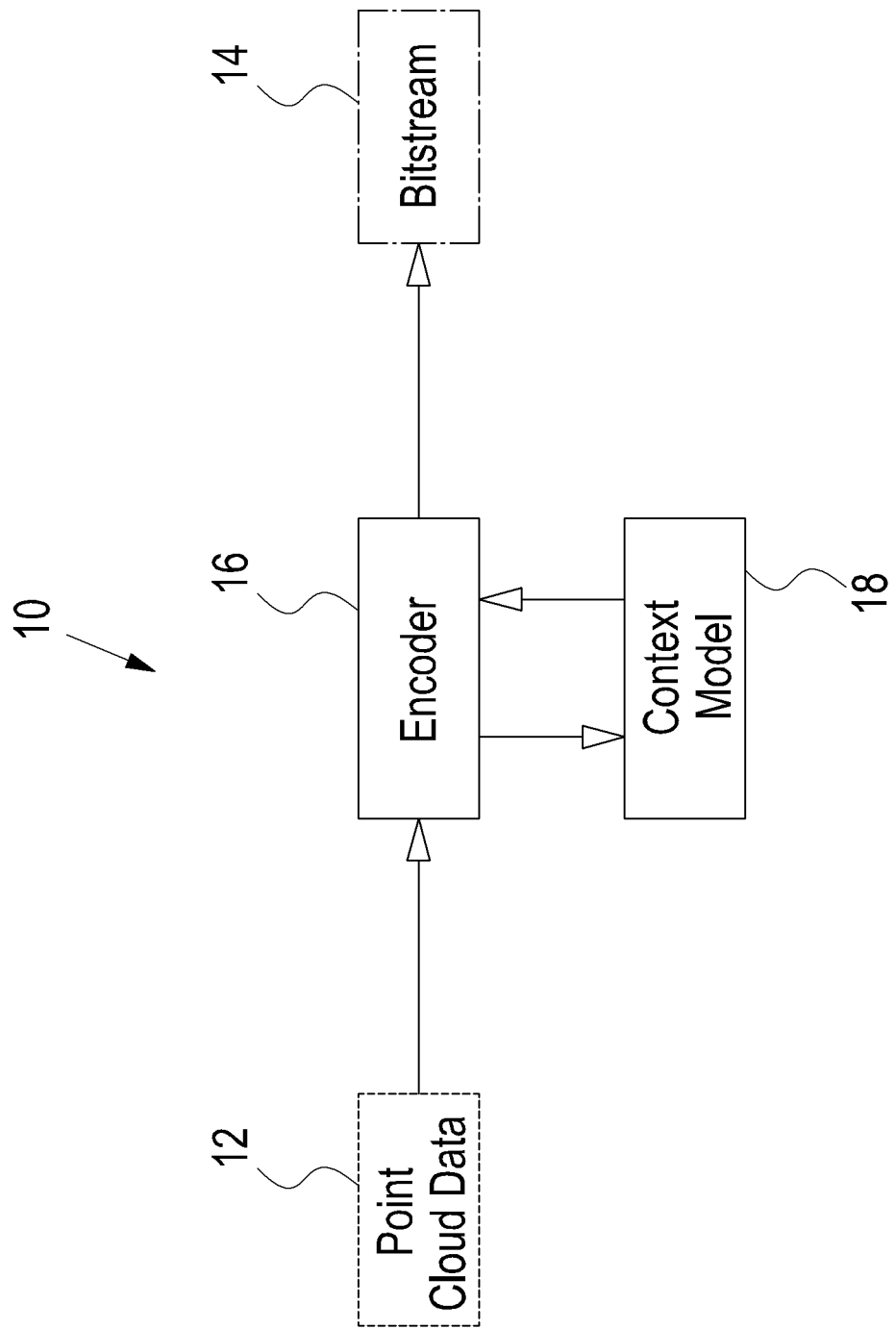
FIG. 1 a block diagram showing a general view of the point cloud encoder.

The present application describes methods of encoding and decoding point clouds, and encoders and decoders for encoding and decoding point clouds. A present parent node associated with a sub-volume is split into further sub-volumes, each further sub-volume corresponding to a child node of the present parent node, and, at the encoder, an occupancy pattern is determined for the present parent node based on occupancy status of the child nodes. A planar context information is determined from the occupancy pattern of the present parent node and an occupancy pattern of a neighboring parent node positioned directly next to the present parent node. The entropy encoder encodes the occupancy pattern based on the determined planar context information to produce encoded data for the bitstream. The decoder determines the same planar context information and entropy decodes the bitstream to reconstruct the occupancy pattern.

Other aspects and features of the present application will be understood by those of ordinary skill in the art from a review of the following description of examples in conjunction with the accompanying figures.

At times in the description below, the terms "node" and "sub-volume" may be used interchangeably. It will be appreciated that a node is associated with a sub-volume. The node is a particular point on the tree that may be an internal node or a leaf node. The sub-volume is the bounded physical space that the node represents. The term "volume" may be used to refer to the largest bounded space defined for containing the point cloud. The volume is recursively divided into sub-volumes for the purpose of building out a tree-structure of interconnected nodes for coding the point cloud data.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points may have other associated attributes, such as color, which may also be a three-component value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LIDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-coloured and highly dynamic point clouds obtained through LIDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment.

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on the resolution of the tree and/or whether there are any points contained in the sub-volume. A leaf node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

Figure 3:
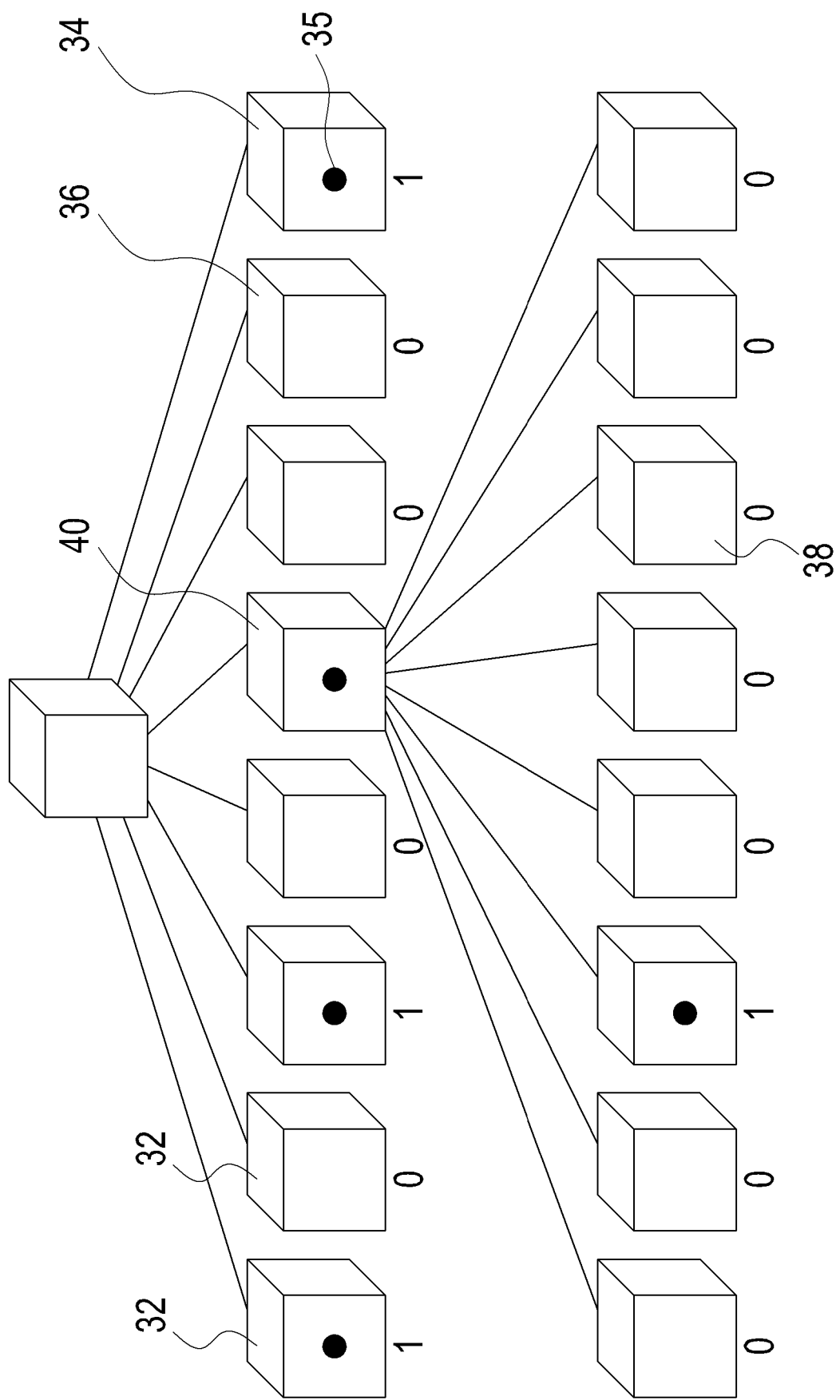
FIG. 3 a schematic illustration of an octree data structure.

A commonly-used tree structure is an octree. In this structure, the volumes/sub-volumes are all cubes and each split of a sub-volume results in eight further sub-volumes/sub-cubes. An example for such a tree-structure is shown in FIG. 3 having a node 30 that might represent the volume containing the complete point cloud. This volume is split into eight sub-volumes 32, each associated with a node in the octree of FIG. 3. Points in the nodes indicate occupied nodes 34 containing at least one point 35 of the point cloud, while empty nodes 36 are representing sub-volumes with no points of the point clouds. As depicted in FIG. 3, occupied nodes might by further split into eight sub-volumes associated with child nodes 38 of a particular parent node 40 in order to determine the occupancy pattern of the parent node 40. As shown in FIG. 3, the occupancy pattern of the exemplified parent node 40 might be represented as "00100000" in a binary form, indicating an occupied third child node 38. In some realizations this occupancy pattern is encoded by a binary entropy encoder to generate a bitstream of the point cloud data.

Reference is now made to FIG. 1, which shows a simplified block diagram of a point cloud encoder 10 in accordance with aspects of the present application. The point cloud encoder 10 receives the point cloud data and might include a tree building module for producing an octree representing the geometry of the volumetric space containing point cloud and indicating the location or position of points from the point cloud in that geometry.

The basic process for creating an octree to code a point cloud may include:
1. Start with a bounding volume (cube) containing the point cloud in a coordinate system;
2. Split the volume into 8 sub-volumes (eight sub-cubes);

3. For each sub-volume, mark the sub-volume with 0 if the sub-volume is empty, or with 1 if there is at least one point in it;
4. For all sub-volumes marked with 1, repeat (2) to split those sub-volumes, until a maximum depth of splitting is reached; and
5. For all leaf sub-volumes (sub-cubes) of maximum depth, mark the leaf cube with 1 if it is non-empty, 0 otherwise.

The tree may be traversed in a pre-defined order (breadth-first or depth-first, and in accordance with a scan pattern/order within each divided sub-volume) to produce a sequence of bits representing the occupancy pattern of each node.

This sequence of bits may then be encoded using an entropy encoder 16 to produce a compressed bitstream 14. The entropy encoder 16 may encode the sequence of bits using a context model 18 that specifies probabilities for coding bits based on a context determination by the entropy encoder 16. The context model 18 may be adaptively updated after coding of each bit or defined set of bits.

Like with video or image coding, point cloud coding can include predictive operations in which efforts are made to predict the pattern for a sub-volume, and the residual from the prediction is coded instead of the pattern itself. Predictions may be spatial (dependent on previously coded sub-volumes in the same point cloud) or temporal (dependent on previously coded point clouds in a time-ordered sequence of point clouds).

Figure 2:
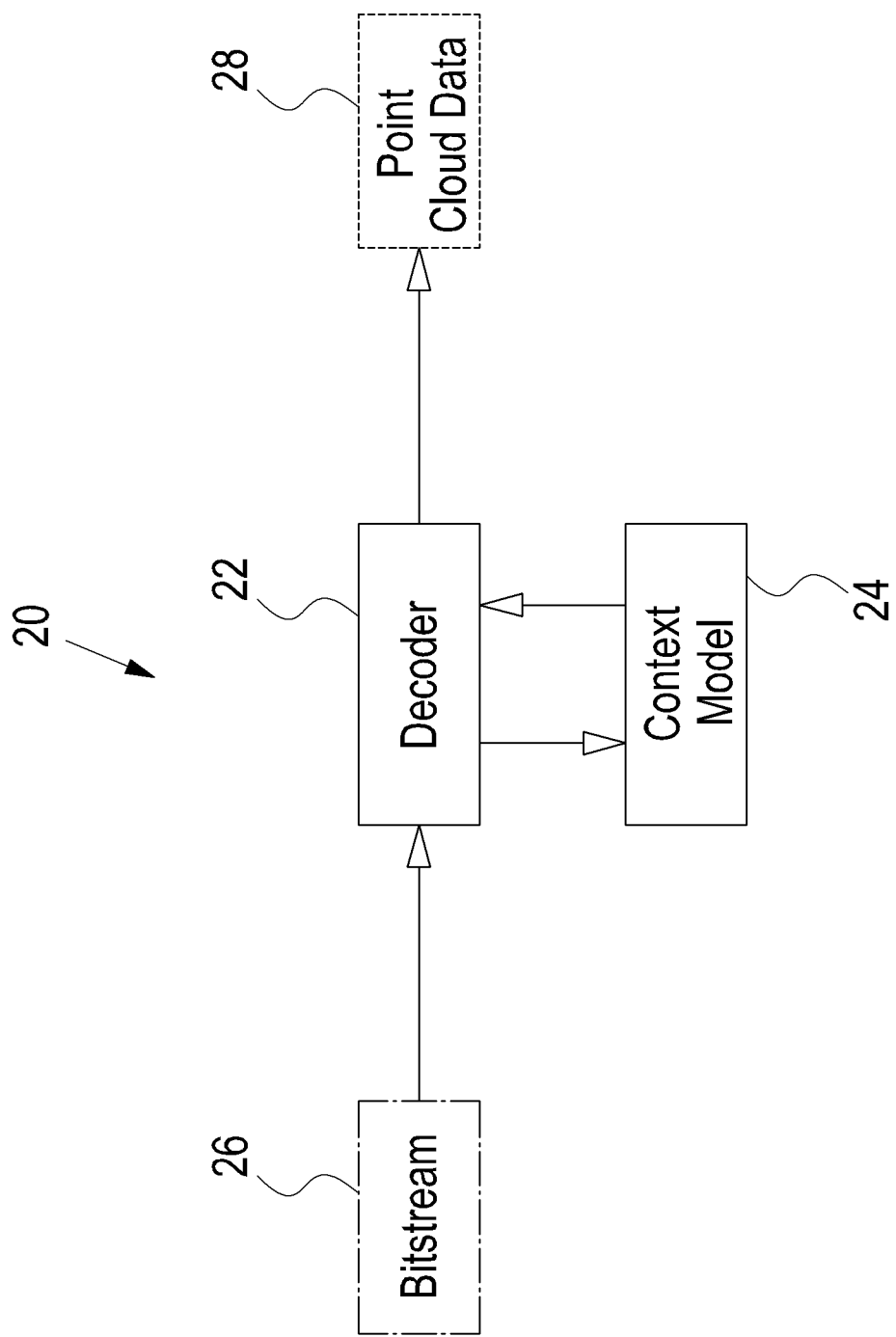
FIG. 2 a block diagram showing a general view of the point cloud decoder.

A block diagram of an example point cloud decoder 20 that corresponds to the encoder 10 is shown in FIG. 2. The point cloud decoder 20 includes an entropy decoder 22 using the same context model 24 used by the encoder 10. The entropy decoder 22 receives the input bitstream 26 of compressed data and entropy decodes the data to produce an output sequence of decompressed bits. The sequence is then converted into reconstructed point cloud data by a tree reconstructor. The tree reconstructor rebuilds the tree structure 28 from the decompressed data and knowledge of the scanning order in which the tree data was binarized. The tree reconstructor is thus able to reconstruct the location of the points from the point cloud.

Referring to FIG. 4, showing a parent node 112 split into its eight child nodes 110 being 2×2×2 cubes with each having the same size and with an edge length being half the edge length of the cube associated with the parent node 112. Further, FIG. 4 indicates the used numbering of the child nodes 110 within a parent node 112. The numbering system shown in FIG. 4 will be used in the further explanation. Therein, FIG. 4 also indicates the spatial orientation of the shown parent node 112 in the three-dimensional space indicated by the geometrical axis X, Y, Z.

Therein, the occupancy pattern might include planar information about the probability whether a certain node is occupied since the point in this node belongs to a surface. Usually, the real world is dominated by closed surfaces. This is in particular true for indoor rooms but also for urban outdoor scenes. This fact is used by the entropy encoder and decoder. If a surface represented by the point cloud can be detected, predictions about the distribution of point on this surface can be made and thus a probability for the occupancy of a certain node belonging to this surface can be made. This might be done by defining context information used for encoded and decoding the bitstream using an isPlanar-flag. Therein, planar context information is usually a binary value wherein a set isPlanar-flag (isPlanar=1) for a certain node is interpreted that there is a prevailing likelihood that this node belongs to a certain surface. In addition to the mere fact of the presence of a surface in a node, further planar information might be considered such as plane position information implemented by a planePosition-flag indicating the position of the plane within the present child node. planePosition-flag might also be a binary value, having the values "high" and "low" referring to the respective position. This planar information is used for encoded to the bitstream by usage of the planar context information by the entropy encoder/decoder thereby reducing the data of the bitstream.

Further, additional coding modes exist which are applied to different types of point clouds, using also different context information. Thus, planar coding mode and angular coding mode are defined. Therein, angular coding mode is preferably applied to sparsely populated point clouds, wherein it is the intention to provide angular context information to the entropy encoder/decoder. Therein, the coding mode might be indicated in the metadata of the bitstream.

Figure 6:
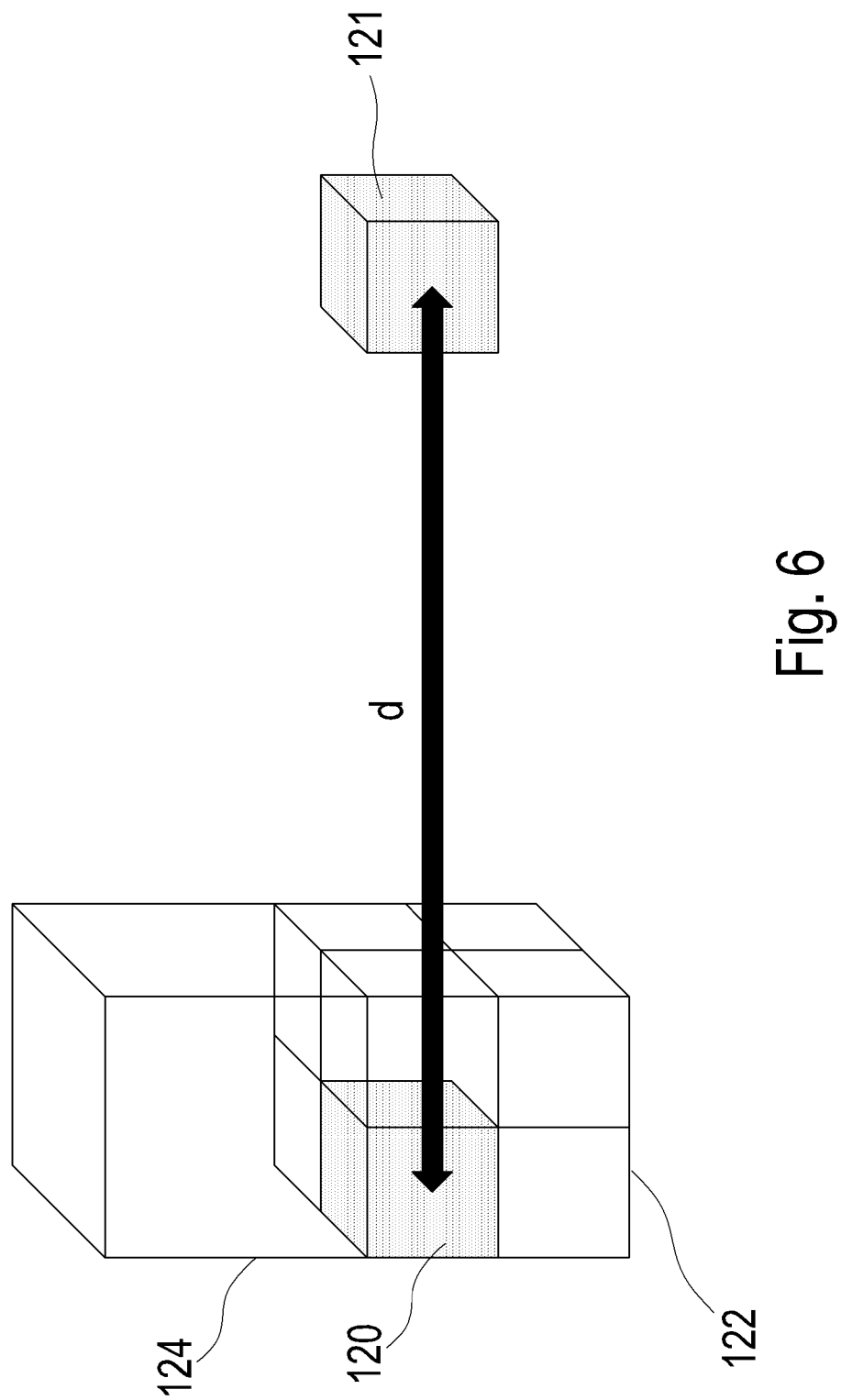
FIG. 6 illustration of the context information.
Figure 10B:
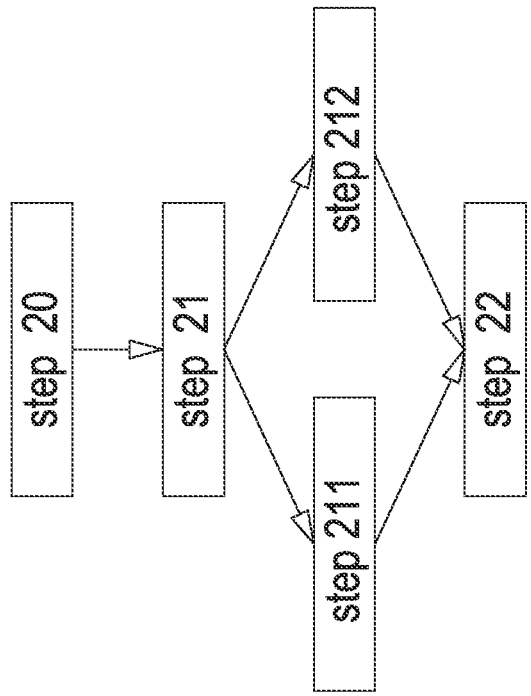
FIGS. 10A and 10B flow charts illustrating the steps of a first and a second embodiment of the present invention, FIG. 11 a schematic illustration of an encoder device, and FIG. 12 a schematic illustration of a decoder device.
Figure 10A:
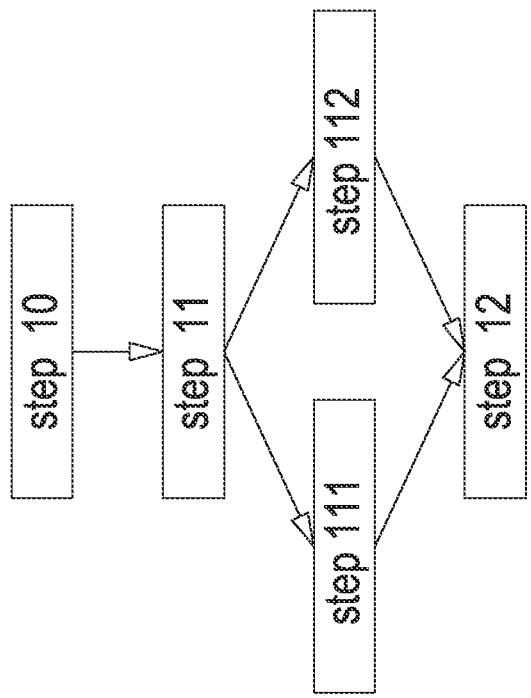

Thus, in accordance to the present disclosure, in the case of the planar coding mode, the context information includes planar context information and plane position context information as indicated above. Therein, the planar context information is determined according to the occupancy pattern of a present parent node of a present child node to be coded and the occupancy pattern of at least one of the neighboring nodes, as described in greater detail below. Additionally, the plane position context information is depicted in FIG. 6. The plane position context information includes the information of:
a) The distance d from the closest already coded node 121 at same coordinate and depth D in the octree structure; d being discretized into three values: "near" or "not too far" or "far";
b) The plane position (if any) of the closest already coded node 121 at same coordinate and depth (low or high)
c) The plane position of present child node according to the occupancy pattern of at least one neighboring parent node as described in greater detail below.

Therein, the planar context information is 1 bit (plane or no plane), and the plane position context information is 3×2×2 bit information.

Further, in accordance with the present disclosure, in the case of the angular coding mode, the context information includes planar context information and plane position context information as indicated above. Therein, the planar context information includes:
a) isPlanar-flag of the present parent node, i.e. whether a plane is present in the present parent node; and
b) the occupancy of the vertical neighboring parent node 124 adjacent to the present parent node.

Additionally, the plane position context information for the angular coding mode includes the information of:
a) planePosition of already available nodes that are identified with regards to an angle between them and the current child node.

Now referring to FIG. 5 showing a present parent node 100 with two child nodes 102, 103 exemplified as occupied nodes, i.e. the sub-volumes of the two child nodes contain each at least one point of the point cloud. Further, indicated in FIG. 5 are neighboring parent nodes 104, 106, 108, each comprising at least one occupied child node itself. Therein, prior to predicting the planar context information of the child nodes 102, 103 at a certain octree-level, occupation information of the three adjacent neighboring parent nodes 104, 106, 108 at the same level D in the octree as the present parent node 100 is known at the decoder side. Due to the given decoding order, upon evaluating the child nodes 102, 103 of the present parent node 100 information about the neighboring parent nodes 104, 108, 106 are already known at the decoder side and can be used to determine the context information. Since these three neighboring parent nodes 104, 106, 108 are adjacent to the present child nodes 102, 103, there exists a correlation between the occupancy pattern of these neighboring parent nodes 104, 106, 108 and the present child nodes 102, 103 to be coded. Therein, the occupancy pattern refers to the occupancy of the child node of the respective parent node. This information is easy to obtain but currently not used in existing encoding and decoding methods. For example, if evaluating the context information of the present child node 102 along the X-axis, the directly adjacent neighboring parent node 104 along the X-axis might be considered. Further, as explained above, the directly adjacent parent node is considered which is in the order of decoding prior to the present parent node. Thus, during decoding the occupancy pattern of the prior nodes are known by the decoder and can be used to determine context information. If the context information is evaluated along the Y-axis, the neighboring parent node 106 along the Y-axis next to the present parent node 100 might be considered. This information is also known to the decoder and can be easily used to acquire reliable planar context information for the present child node 102.

However, when considering the correlation between the occupancy of the present child node and the occupancy pattern of the at least one neighboring parent node also the position of the present child node to be coded must be taken into account. Thus, the present plane position is determined for the present child node. Therein, the present plane position indicates a plane of the present child node within the present parent node along the axis under consideration and a plane perpendicular to this geometrical axis. Along the X-axis for example, a first low plane is defined by the child nodes 0-3, while a high plane is defined by the child nodes 4-7. Along the Y-axis, the low plane is defined by the child nodes 0,1,4,5 and a high plane by the child nodes 2,3,6,7. Along the Z-axis, a low plane is defined by the child nodes 0,2,4,6 and a high plane by the child nodes 1,3,5,7. Thus, in the example of FIG. 5, the child node 102 along the X-axis has a present plane position of a low plane position and the child node 103 along the X-axis has a present plane position of a high plane position.

Now referring to FIG. 7 showing the configuration of how to determine planar context and plane position context information from the occupancy of the neighboring nodes of the present child node which then can be used in the entropy encoding in order to compress the point cloud data. In this regard, it is an object of the present invention to consider the occupancy pattern of the parent neighbors to the present child node 120 and to incorporate such information in the context information when coding the planar information. Therein, FIG. 7 refers to the situation that the present child to be coded is in the low position of the present parent node.

FIG. 7A shows the determination of the planar context information along the X-axis. The planar context information of the present child node 120 shall be evaluated. Therefore, the occupancy pattern of the present parent node 122 as well as the neighboring parent node 123 directly adjacent to the present parent node 122 is evaluated. Therein, the neighboring parent node 124 is arranged along the X-axis which is to be evaluated. Further, the neighboring parent node 124 is arranged prior to the present parent node 122 in order of decoding. Thus, upon decoding the present parent node 122, all information about the neighboring parent node 124 is already available. In addition, also during coding the information of the present child node 120 occupancy information about the neighboring parent node 124 is also known, since positions and thus occupancy pattern of the point cloud is completely known to the encoder.

In particular, in order to determine the context information of the present child node 120, a first group 126 of child nodes, being child nodes of the neighboring parent node 124, and a second group 128, being child nodes of the present parent node 122 are considered. Therein, the four child nodes of the first group 126 of the neighboring parent node 124 are directly next and adjacent to the present parent node 122. Thus, the child nodes of the first group 126 each share a common surface with the present parent node 122. The second group 128 of the four child nodes of the present parent node 122 is directly opposite the first group. Thus, by the four child nodes of the second group 128, a side face of the present parent node 122 is formed which is directly opposite to the side face which is the common surface between the neighboring parent node 124 and the present parent node 122. In other words, by the first group 126 and the second group 128 planes are defined which are on both sides of the present child node 120 and which are perpendicular to the axis under consideration. Thus, by these two planes a reliable determination of the context information can be provided. A surface in the point cloud going through the present child node 120 is also highly likely going through one of the planes defined by the first group 126 or the second group 128 and thus the context information of the present child node 120 strongly depends on the occupancy of the first group 126 and/or the occupancy of the second group 128.

Generally speaking for the case of the present plane position being low, if at least one child node of the first group is occupied and the second group is not occupied, the planar context information includes the likelihood of a plane and the plane position context information includes the likelihood of a low plane position. If the first group is not occupied and at least one child node of the second group is occupied, the planar context information includes the likelihood of a plane and the plane position context information includes the likelihood of a high plane position. If the first group is not occupied and the second group is not occupied, the planar context information includes the likelihood of a plane, wherein the plane position context information includes the likelihood of a low plane, if at least one or more child nodes in the neighboring parent node are occupied which do not belong to the first group and "UNKNOWN" otherwise. If at least one child node of the first group is occupied and at least one child node of the second group is occupied and #FirstGroup>#SecondGroup+1, the planar context information includes the likelihood of a plane and the plane position context information includes the likelihood of a low plane position. If at least one child node of the first group is occupied and at least one child node of the second group is occupied and #FirstGroup<#SecondGroup+1, the planar context information includes the likelihood of a plane and the plane position context information includes the likelihood of a high plane position. Therein #FirstGroup indicates the number of occupied nodes in the first group and #SecondGroup indicates the number of occupied nodes in the second group.

More specifically speaking, for the evaluation along the X-axis together with the numbering system shown in FIG. 4:

If at least one of the child nodes 4 to 7 of the first group is occupied and the child nodes 4 to 7 of the second group are not occupied, the planar context information includes the likelihood of a plane and the plane position context information includes the likelihood of a low plane position.

If the child nodes 4 to 7 of the first group are not occupied and at least one of the child nodes 4 to 7 of the second group is occupied, the planar context information includes the likelihood of a plane and the plane position context information includes the likelihood of a high plane position.

If the child nodes 4 to 7 of the first group are not occupied and the child nodes 4 to 7 of the second group are not occupied, the planar context information includes the likelihood of a plane, wherein the plane position context information includes the likelihood of a low plane, if at least one or more child nodes 0 to 3 in the neighboring parent node are occupied and "UNKNOWN" otherwise.

If at least one of the child nodes 4 to 7 of the first group is occupied and at least one of the child nodes 4 to 7 of the second group is occupied and #FirstGroup>#SecondGroup+1, the planar context information includes the likelihood of a plane and the plane position context information includes the likelihood of a low plane position.

If at least one of the child nodes 4 to 7 of the first group is occupied and at least one of the child nodes 4 to 7 of the second group is occupied and #FirstGroup<#SecondGroup+1, the planar context information includes the likelihood of a plane and the plane position context information includes the likelihood of a high plane position.

Thus, for the coding the probability of a presence or an absence of a plane perpendicular to the X-axis in the present child node is considered as context information when performing entropy coding for a present plane position being low position. Therein, the information might be used as planar context information in the planar coding mode and the angular coding mode and might be included as plane position context information in the planar coding mode.

For evaluating along Y-axis in accordance to FIG. 7B in order to determine the planar context information of the present child node 120 it is set the following:

If at least one of the child nodes 2,3,6,7 of the first group is occupied and the child nodes 2,3,6,7 of the second group are not occupied, the planar context information includes the likelihood of a plane and the plane position context information includes the likelihood of a low plane position.

If the child nodes 2,3,6,7 of the first group are not occupied and at least one of the child nodes 2,3,6,7 of the second group is occupied, the planar context information includes the likelihood of a plane and the plane position context information includes the likelihood of a high plane position.

If the child nodes 2,3,6,7 of the first group are not occupied and the child nodes 2,3,6,7 of the second group are not occupied, the planar context information includes the likelihood of a plane, wherein the plane position context information includes the likelihood of a low plane, if at least one or more child nodes 0,1,4,5 in the neighboring parent node are occupied and "UNKNOWN" otherwise.

If at least one of the child nodes 2,3,6,7 of the first group is occupied and at least one of the child nodes 2,3,6,7 of the second group is occupied and #FirstGroup>#SecondGroup+1, the planar context information includes the likelihood of a plane and the plane position context information includes the likelihood of a low plane position.

If at least one of the child nodes 2,3,6,7 of the first group is occupied and at least one of the child nodes 2,3,6,7 of the second group is occupied and #FirstGroup<#SecondGroup+1, the planar context information includes the likelihood of a plane and the plane position context information includes the likelihood of a high plane position.

Thus, for the coding the probability of a presence or an absence of a plane perpendicular to the Y-axis in the present child node is considered as context information when performing entropy coding for a present plane position being low position. Therein, the information might be used as planar context information in the planar coding mode and the angular coding mode and might be included as plane position context information in the planar coding mode.

For evaluating along the Z-axis in accordance to FIG. 7C in order to determine the planar context information of the present child node 120 it is set the following:

If at least one of the child nodes 1,3,5,7 of the first group is occupied and the child nodes 1,3,5,7 of the second group are not occupied, the planar context information includes the likelihood of a plane and the plane position context information includes the likelihood of a low plane position.

If the child nodes 1,3,5,7 of the first group are not occupied and at least one of the child nodes 1,3,5,7 of the second group is occupied, the planar context information includes the likelihood of a plane and the plane position context information includes the likelihood of a high plane position.

If the child nodes 1,3,5,7 of the first group are not occupied and the child nodes 1,3,5,7 of the second group are not occupied, the planar context information includes the likelihood of a plane, wherein the plane position context information includes the likelihood of a low plane, if at least one or more child nodes 0,2,4,6 in the neighboring parent node are occupied and "UNKNOWN" otherwise.

If at least one of the child nodes 1,3,5,7 of the first group is occupied and at least one of the child nodes 1,3,5,7 of the second group is occupied and #FirstGroup>#SecondGroup+1, the planar context information includes the likelihood of a plane and the plane position context information includes the likelihood of a low plane position.

If at least one of the child nodes 1,3,5,7 of the first group is occupied and at least one of the child nodes 1,3,5,7 of the second group is occupied and #FirstGroup<#SecondGroup+1, the planar context information includes the likelihood of a plane and the plane position context information includes the likelihood of a high plane position.

Thus, for the coding the probability of a presence or an absence of a plane perpendicular to the Z-axis in the present child node is considered as context information when performing entropy coding for a present plane position being low position. Therein, the information might be used as planar context information in the planar coding mode and the angular coding mode and might be included as plane position context information in the planar coding mode.

As indicated above, the situation is different, if the present plane position for the present child node to be coded is high plane position. Then, the present child node is next to the neighboring parent following the present parent in the order of coding. In this case, the occupancy of the child nodes of the neighboring parent is unknown and only the occupancy of the neighboring parent node itself can be used in order to determine the context information.

In particular, if the present plane position is high, the planar context information and plane position context information is determined according to an occupancy of the neighboring parent node that is along the axis under consideration directly after the present parent node, and the occupancy of a group of four child nodes of the present parent node in a plane directly perpendicular to the axis under consideration and next to the present child node. In other words, the occupancy of the child nodes of the neighboring parent node directly adjacent to the common surface of the present parent node are usually unknown due to the decoding order. Thus, the occupancy of the neighboring parent node itself, sharing a common surface with the present child node is used together with a group 132 within the present parent node 122 arranged directly adjacent to the opposite side of the present parent node 122, i.e. opposite to the neighboring parent node 130. Therein, the group 132 preferably defines a plane by the four child nodes, wherein the plane is perpendicular to the considered geometrical axis and directly adjacent to the present child node to be evaluated within the present parent node.

Generally speaking for the case of the present plane position being low, if at least one child node of the group 132 is occupied and the neighboring parent node 130 is not occupied, the planar context information includes the likelihood of a plane and the plane position context information includes the likelihood of a low plane position. If the group 132 is not occupied and the neighboring parent node 130 is occupied, the planar context information includes the likelihood of a plane and the plane position context information includes the likelihood of a high plane position. If the group 130 is not occupied and the neighboring parent node 130 is not occupied, the planar context information includes the likelihood of a plane, wherein the plane position context information includes the likelihood of a low plane, if at least one or more child nodes 136 in a neighboring parent node 134 along the axis under consideration directly before the present parent node 122 are occupied and "UNKNOWN" otherwise. If at least one child node of the group 132 is occupied and the neighboring parent node 130 is occupied and #Group>2, the planar context information includes the likelihood of a plane and the plane position context information includes the likelihood of a low plane position. If at least one child node of the group 132 is occupied and the neighboring parent node 130 is occupied and #Group<2, the planar context information includes the likelihood of a plane and the plane position context information includes the likelihood of a high plane position. If at least one child node of the group 132 is occupied and the neighboring parent node 130 is occupied and #Group=2, the planar context information includes the likelihood that there is no plane and consequently the plane position is unknown. Therein, #Group indicates the number of occupied child nodes in the group 130.

More specifically speaking, for the evaluation along the X-axis with reference to FIG. 8A:

If at least one of the child nodes 0 to 3 of the group 132 is occupied and the neighboring parent node 130 is not occupied, the planar context information includes the likelihood of a plane and the plane position context information includes the likelihood of a low plane position.

If the child nodes 0 to 3 of the group 132 are not occupied and the neighboring parent node 130 is occupied, the planar context information includes the likelihood of a plane and the plane position context information includes the likelihood of a high plane position.

If the child nodes 0 to 3 of the group 132 are not occupied and the neighboring parent node 130 is not occupied, the planar context information includes the likelihood of a plane, wherein the plane position context information includes the likelihood of a low plane, if at least one or more child nodes 4 to 7 in a neighboring parent node 134 along the axis under consideration directly before the present parent node 122 as depicted in FIG. 9A are occupied and "UNKNOWN" otherwise.

If at least one of the child nodes 0 to 3 of the group 132 is occupied and the neighboring parent node 130 is occupied and #Group>2, the planar context information includes the likelihood of a plane and the plane position context information includes the likelihood of a low plane position.

If at least one of the child nodes 0 to 3 of the group 132 is occupied and the neighboring parent node 130 is occupied and #Group<2, the planar context information includes the likelihood of a plane and the plane position context information includes the likelihood of a high plane position.

If at least one of the child nodes 0 to 3 of the group 132 is occupied and the neighboring parent node 130 is occupied and #Group=2, the planar context information includes the likelihood of the absence of a plane and the plane position is inferred to be unknown. Therein, #Group indicates the number of occupied nodes in the group.

Thus, for the coding the probability of a presence or an absence of a plane perpendicular to the X-axis in the present child node 120 is considered as context information when performing entropy coding for a present plane position being low position. Therein, the information might be used as planar context information in the planar coding mode and the angular coding mode and might be included as plane position context information in the planar coding mode.

For evaluating along the Y-axis in accordance to FIG. 8B in order to determine the planar context information of the present child node 120 it is set the following:

If at least one of the child nodes 0,1,4,5 of the group 132 is occupied and the neighboring parent node 130 is not occupied, the planar context information includes the likelihood of a plane and the plane position context information includes the likelihood of a low plane position.

If the child nodes 0,1,4,5 of the group 132 are not occupied and the neighboring parent node 130 is occupied, the planar context information includes the likelihood of a plane and the plane position context information includes the likelihood of a high plane position.

If the child nodes 0,1,4,5 of the group 132 are not occupied and the neighboring parent node 130 is not occupied, the planar context information includes the likelihood of a plane, wherein the plane position context information includes the likelihood of a low plane, if at least one or more child nodes 2,3,6,7 in a neighboring parent node 134 along the axis under consideration directly before the present parent node 122 as depicted in FIG. 9B are occupied and "UNKNOWN" otherwise.

If at least one of the child nodes 0,1,4,5 of the group 132 is occupied and the neighboring parent node 130 is occupied and #Group>2, the planar context information includes the likelihood of a plane and the plane position context information includes the likelihood of a low plane position.

If at least one of the child nodes 0,1,4,5 of the group 132 is occupied and the neighboring parent node 130 is occupied and #Group<2, the planar context information includes the likelihood of a plane and the plane position context information includes the likelihood of a high plane position.

If at least one of the child nodes 0,1,4,5 of the group 132 is occupied and the neighboring parent node 130 is occupied and #Group=2, the planar context information includes the likelihood of the absence of a plane and the plane position is inferred to be unknown. Therein, #Group indicates the number of occupied nodes in the group.

Thus, for the coding the probability of a presence or an absence of a plane perpendicular to the Y-axis in the present child node 120 is considered as context information when performing entropy coding for a present plane position being low position. Therein, the information might be used as planar context information in the planar coding mode and the angular coding mode and might be included as plane position context information in the planar coding mode.

For evaluating along the Z-axis in accordance to FIG. 8C in order to determine the planar context information of the present child node 120 it is set the following:

If at least one of the child nodes 0,2,4,6 of the group 132 is occupied and the neighboring parent node 130 is not occupied, the planar context information includes the likelihood of a plane and the plane position context information includes the likelihood of a low plane position.

If the child nodes 0,2,4,6 of the group 132 are not occupied and the neighboring parent node 130 is occupied, the planar context information includes the likelihood of a plane and the plane position context information includes the likelihood of a high plane position.

If the child nodes 0,2,4,6 of the group 132 are not occupied and the neighboring parent node 130 is not occupied, the planar context information includes the likelihood of a plane, wherein the plane position context information includes the likelihood of a low plane, if at least one or more child nodes 1,3,5,7 in a neighboring parent node 134 along the axis under consideration directly before the present parent node 122 as depicted in FIG. 9C are occupied and "UNKNOWN" otherwise.

If at least one of the child nodes 0,2,4,6 of the group 132 is occupied and the neighboring parent node 130 is occupied and #Group>2, the planar context information includes the likelihood of a plane and the plane position context information includes the likelihood of a low plane position.

If at least one of the child nodes 0,2,4,6 of the group 132 is occupied and the neighboring parent node 130 is occupied and #Group<2, the planar context information includes the likelihood of a plane and the plane position context information includes the likelihood of a high plane position.

If at least one of the child nodes 0,2,4,6 of the group 132 is occupied and the neighboring parent node 130 is occupied and #Group=2, the planar context information includes the likelihood of the absence of a plane and the plane position is inferred to be unknown. Therein, #Group indicates the number of occupied nodes in the group 132.

Thus, for the coding the probability of a presence or an absence of a plane perpendicular to the Y-axis in the present child node is considered as context information when performing entropy coding for a present plane position being low position. Therein, the information might be used as planar context information in the planar coding mode and the angular coding mode and might be included as plane position context information in the planar coding mode.

As a summary, in all cases, a reliable planar context information model is established which can be used for the entropic encoding in order to consider the occurrence of a surface or plane in the respective nodes and use this knowledge to validly predict occupancy of nodes for data compression by the entropy encoder/decoder.

Under some circumstances it is not possible or not useful to implement the set of context information as mentioned above. Thus, for the plane position context information in the planar coding mode, the present GPCC specification proposes to use a specific context model using an axisIdx statement (values=0, 1, or 2) identifying the axis normal to the plane of coding the planePosition, if the closest already coded node at the same coordinate and the same depth is not planar or non-existent. However, this approach neglects information provided by the occupancy of the neighboring nodes. According to the present invention, still inferences can be made from the occupancy of the neighboring child nodes within the same parent node and same plane perpendicular to the axis under consideration as the present child node. If for example, the X-axis is considered and the present child node is at the coordinate 2, then the information of the child nodes 0 and 1 in the present parent node and in the same vertical plane perpendicular to the X-axis is known and can be used to determine plane position context information, for example by using the plane position context information of one of these nodes or the majority of these nodes as plane position context information of the present child node to be coded. If for example, the X-axis is considered and the present child node is at the coordinate 7, then the information of the child nodes 4 to 6 in the present parent node and in the same vertical plane perpendicular to the X-axis is known and can be used to determine plane position context information. Thus, the plane position context information may replace the proposed axisIdx-statement to provide improved context information for more efficient entropy coding if the closest already coded node at the same coordinate and the same depth D is non-existent. Thus, the above proposed context model for the plane position context information in the planar coding mode is replaced by a) The plane position of present child node according to the occupancy of at least one neighboring node.

Further, for the angular coding mode, even if a point cloud is indicated to be coded by the angular coding mode, one or more nodes of the point could might not be eligible for this coding mode. In this case the plane position context information of the angular coding mode is replaced by the plane position context information according to the planar mode as described in greater detail above.

Referring now to FIG. 7A showing a method for encoding a point cloud including the steps of determining a coding mode, wherein the coding mode includes Planar Coding Mode and Angular Coding Mode (S10);

Obtaining coding context information for a present child node (S11), wherein if the coding mode is the planar coding mode, coding context information includes planar context information, wherein planar context information of the present child node is determined according to the occupancy of the present parent and the occupancy of at least one neighboring parent node positioned directly next to the present parent node (S111);

if the coding mode is the Angular Coding Mode, the coding context information of a present child node includes planar information of the present parent node and the occupancy of the vertical parent neighbor adjacent to the present parent node (S112); and Entropy encoding the present child node based on the determined coding context information to produce encoded data for the bitstream (S12).

Referring now to FIG. 7B showing a method for decoding a point cloud including the steps of Determining a coding mode, wherein the coding mode includes Planar Coding Mode and Angular Coding Mode (S20);

Obtaining coding context information for a present child node (S21), wherein if the coding mode is the planar coding mode, coding context information includes planar context information, wherein planar context information of the present child node is determined according to the occupancy of the present parent node and the occupancy of at least one neighboring parent node positioned directly next to the present parent node (S211);

if the coding mode is the angular coding mode, the coding context information of a present child node includes planar information of the present parent node and the occupancy of the vertical parent neighbor adjacent to the present parent node (S212); and Entropy decoding the bitstream based on the context information of the present child node to reconstruct the point cloud (S22).

Thus, in accordance to the present invention, information about the neighboring nodes are used and evaluated in order to acquire a context information model more reliably predicting the occurrence of a surface within the present child node. This information can be used in order to reduce the amount of data of the compressed point cloud data, wherein the same context information model is also used for the decoder in order to be able to reliably decode the provide bitstream with high efficiency and accuracy. Thereby, significant data reduction of at least 1% can be achieved with respect to prior encoding methods and current GPCC specification. However, this value is dependent on the density of the points wherein in particular for indoor point clouds, such as LIDAR point clouds it is assumed that they can be considered as a dense point cloud.

In embodiments of the encoding or decoding method, if the coding mode is the planar coding mode, the coding context information includes planar context information including:

Existence of a plane according to the occupancy pattern of the present parent node and the occupancy pattern of at least one neighboring parent node positioned directly next to the present parent node.

In embodiments of the encoding or decoding method, if the coding mode is the planar coding mode, the coding context information includes plane position context information, wherein the plane position context information includes one or more of:

The distance d from the closest already node at the same coordinate in the respective parent node and the same depth D in the octree-based structure;

The plane position of the closest already coded node at the same coordinate in the respective parent node and the same depth D in the octree-based structure; and The plane position of the present child node according to the occupancy pattern of at least one neighboring parent node positioned next to the present parent node.

In embodiments of the encoding or decoding method, if the closest already coded node at the same coordinate in the respective parent node and the same depth D in the octree-based structure is non-existent then the plane position context information only includes the plane position of the present child node according to the occupancy pattern of at least one neighboring parent node positioned directly next to the present parent node.

In embodiments of the encoding or decoding method, if the coding mode is the angular coding mode, the coding context information includes planar context information, wherein the planar context information includes one or more of:

The isPlanar flag of the present parent node; and

The occupancy of the vertical neighboring parent node directly next to the present, i.e. perpendicular to the axis under consideration directly before the present parent node in the order of decoding.

In embodiments of the encoding or decoding method, if the coding mode is the angular coding mode and the present child node is not eligible for angular coding mode, the coding context information includes plane position context information, wherein the plane position context information includes one or more of:

The distance d from the closest already node at the same coordinate in the respective parent node and the same depth D in the octree-based structure;

The plane position of the closest already coded node at the same coordinate in the respective parent node and the same depth D in the octree-based structure; and The plane position of the present child node according to the occupancy of at least one neighboring parent node positioned directly next to the present parent node.

In embodiments of the encoding or decoding method, for determining the planar context information and the plane position context information according to the occupancy pattern of at least one neighboring parent node, a present plane position of the present child node relative to the present parent node is determined, wherein the present plane position includes high plane position and low plane position.

In embodiments of the encoding or decoding method, if the present plane position is low plane position, the planar context information and plane position context information is determined according to an occupancy of a first group of four child nodes of the neighboring parent node that are directly next to the present parent node and the occupancy of a second group of four child nodes of the present parent node directly opposite the first group.

In embodiments of the encoding or decoding method, for the present plane position being at low plane position, if at least one child node of the first group is occupied and the second group is not occupied, the planar context information includes the likelihood of a plane and the plane position context information includes the likelihood of a low plane position.

In embodiments of the encoding or decoding method, for the present plane position being at low plane position, if the first group is not occupied and at least one child node of the second group is occupied, the planar context information includes the likelihood of a plane and the plane position context information includes the likelihood of a high plane position.

In embodiments of the encoding or decoding method, for the present plane position being at low plane position, if the first group is not occupied and the second group is not occupied, the planar context information includes the likelihood of a plane, wherein the plane position context information includes the likelihood of a low plane, if at least one or more child nodes in the neighboring parent node are occupied which do not belong to the first group and "UNKNOWN" otherwise.

In embodiments of the encoding or decoding method, for the present plane position being at low plane position, if at least one child node of the first group is occupied and at least one child node of the second group is occupied and #FirstGroup>#SecondGroup+1, the planar context information includes the likelihood of a plane and the plane position context information includes the likelihood of a low plane position, wherein #FirstGroup indicates the number of occupied nodes in the first group and #SecondGroup indicates the number of occupied nodes in the second group.

In embodiments of the encoding or decoding method, for the present plane position being at low plane position, if at least one child node of the first group is occupied and at least one child node of the second group is occupied and #FirstGroup<#SecondGroup+1, the planar context information includes the likelihood of a plane and the plane position context information includes the likelihood of a high plane position, wherein #FirstGroup indicates the number of occupied nodes in the first group and #SecondGroup indicates the number of occupied nodes in the second group.

In embodiments of the encoding or decoding method, if the present plane position is high, the planar context information and plane position context information is determined according to an occupancy of the neighboring parent node that is along the axis under consideration directly after the present parent node, and the occupancy of a group of four child nodes of the present parent node in a plane directly perpendicular to the axis under consideration and next to the present child node.

In embodiments of the encoding or decoding method, for the present plane position being at high plane position, if at least one child node of the group is occupied and the neighboring parent node is not occupied, the planar context information includes the likelihood of a plane and the plane position context information includes the likelihood of a low plane position.

In embodiments of the encoding or decoding method, for the present plane position being at high plane position, if the group is not occupied and the neighboring parent node is occupied, the planar context information includes the likelihood of a plane and the plane position context information includes the likelihood of a high plane position.

In embodiments of the encoding or decoding method, for the present plane position being at high plane position, if the group is not occupied and the neighboring parent node is not occupied, the planar context information includes the likelihood of a plane, wherein the plane position context information includes the likelihood of a low plane, if at least one or more child nodes in a neighboring parent node along the axis under consideration directly before the present parent node are occupied and "UNKNOWN" otherwise.

In embodiments of the encoding or decoding method, for the present plane position being at high plane position, if at least one child node of the group is occupied and the neighboring parent node is occupied and #Group>2, the planar context information includes the likelihood of a plane and the plane position context information includes the likelihood of a low plane position, wherein #Group indicates the number of occupied nodes in the group.

In embodiments of the encoding or decoding method, for the present plane position being at high plane position, if at least one child node of the group is occupied and the neighboring parent node is occupied and #Group<2, the planar context information includes the likelihood of a plane and the plane position context information includes the likelihood of a high plane position, wherein #Group indicates the number of occupied nodes in the group.

In embodiments of the encoding or decoding method, for the present plane position being at high plane position, if at least one child node of the group is occupied and the neighboring parent node is occupied and #Group=2, the planar context information includes the likelihood of the absence of a plane and the plane position is inferred to be unknown, wherein #Group indicates the number of occupied nodes in the group.

In embodiments of the encoding or decoding method, the neighboring parent node is arranged along one of the geometrical axes.

In embodiments of the encoding or decoding method, the planar context information is determined along all three geometrical axes.

In embodiments of the encoding or decoding method, the present parent node is arranged relatively to the neighboring parent node in order of decoding.

In a preferred embodiment the method for encoding/decoding a point cloud to generate a bitstream of compressed point cloud data is implemented in a LIDAR (Light detection and ranging) device. The LIDAR device comprises a light transmitting module and a sensor module. Therein, the light transmitting module is configured to scan the environment with laser light and an echo of the laser light reflected by objects in the environment is measured with a sensor of the sensor module. Further, the LIDAR device comprises an evaluation module configured to determine a 3D representation of the environment in a point cloud preferably by differences in laser return times and/or wavelengths of the reflected laser light. Thereby, the echo may include up to millions of points of position information of the objects or environment resulting in large point clouds increasing the demands on computational devices to further process or evaluating this point clouds. In certain applications such as autonomous driving, processing of the LIDAR point cloud must be almost in real-time due to safety requirements. Thus, efficient and accurate compression of the point could data is necessary. Therefore, the LIDAR device may comprise an encoder including a processor and a memory storage device. The memory storage device may store a computer program or application containing instructions that, when executed, cause the processor to perform operations such as those described herein. For example, the instructions may encode and output bitstreams encoded in accordance with the methods described herein. Additionally, or alternatively, the LIDAR device may comprise a decoder including a processor and a memory storage device. The memory storage device may include a computer program or application containing instructions that, when executed, cause the processor to perform operations such as those described herein. Thus, by the encoder/decoder efficient and accurate compression of the point cloud data is enabled, providing the possibility to handle the acquired point cloud data more efficiently and preferably in real-time. Preferably, the processor of the encoder and the processor of the decoder are the same. Preferably, the memory storage device of the encoder and the memory storage device of the decoder are the same. Preferably the processor of the encoder and/or decoder are further configured to further process or evaluate the point cloud even more preferably in real-time. In particular, for the example of autonomous driving, evaluation of the point cloud could include determination of obstacles in the direction of driving.

Figure 11:
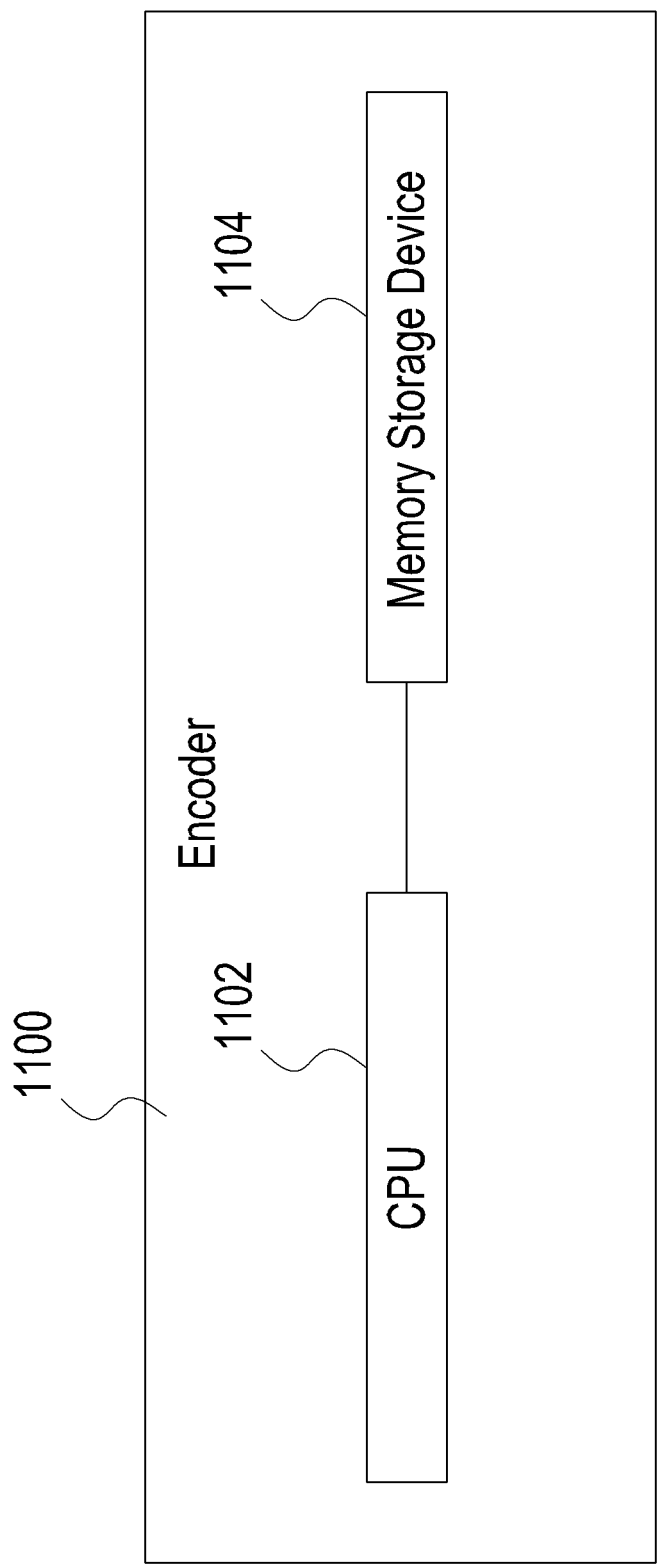

Reference is now made to FIG. 11, which shows a simplified block diagram of an example embodiment of an encoder 1100. The encoder 1100 includes a processor 1102 and a memory storage device 1104. The memory storage device 1104 may store a computer program or application containing instructions that, when executed, cause the processor 1102 to perform operations such as those described herein. For example, the instructions may encode and output bitstreams encoded in accordance with the methods described herein. It will be understood that the instructions may be stored on a non-transitory computer-readable medium, such as a compact disc, flash memory device, random access memory, hard drive, etc. When the instructions are executed, the processor 1102 carries out the operations and functions specified in the instructions so as to operate as a special-purpose processor that implements the described process(es). Such a processor may be referred to as a "processor circuit" or "processor circuitry" in some examples.

Figure 12:
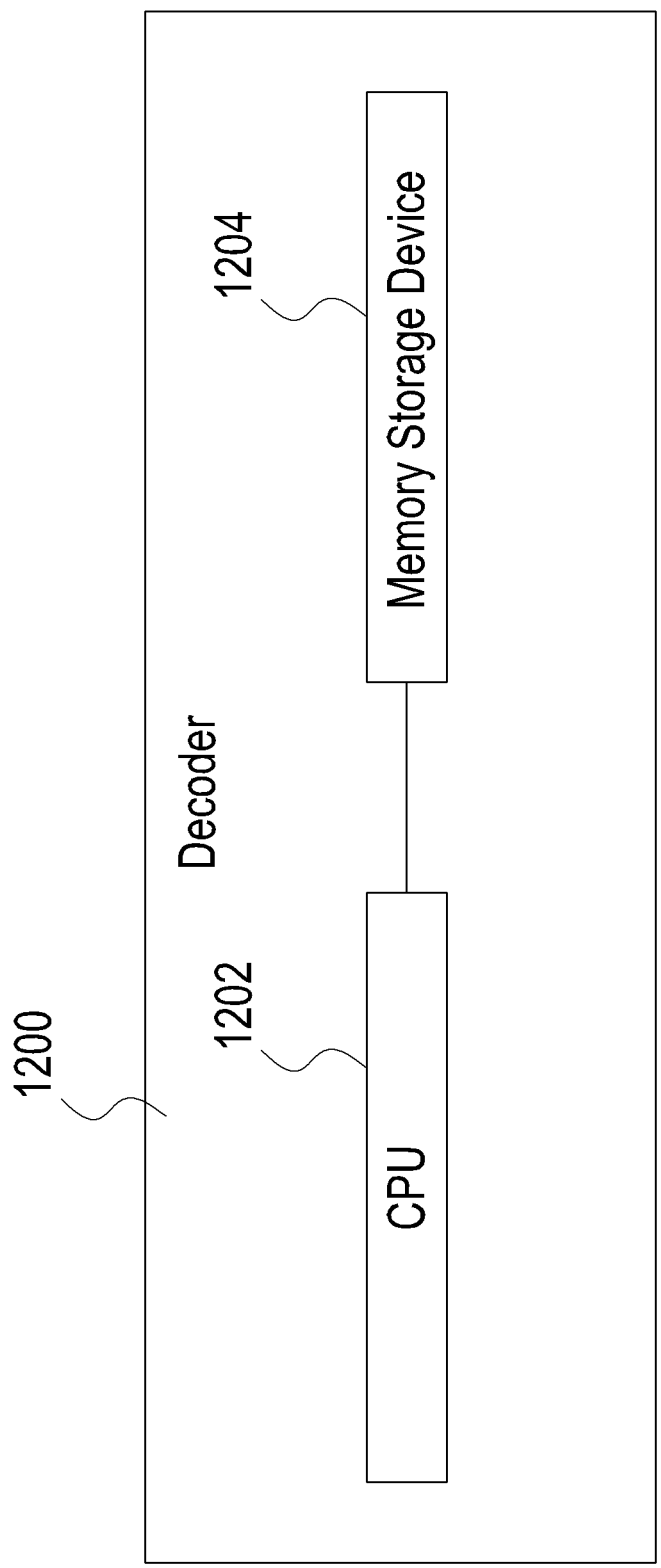

Reference is now also made to FIG. 12, which shows a simplified block diagram of an example embodiment of a decoder 1200. The decoder 1200 includes a processor 1202 and a memory storage device 1204. The memory storage device 1204 may include a computer program or application containing instructions that, when executed, cause the processor 1202 to perform operations such as those described herein. It will be understood that the instructions may be stored on a computer-readable medium, such as a compact disc, flash memory device, random access memory, hard drive, etc. When the instructions are executed, the processor 1202 carries out the operations and functions specified in the instructions so as to operate as a special-purpose processor that implements the described process(es) and methods. Such a processor may be referred to as a "processor circuit" or "processor circuitry" in some examples.

It will be appreciated that the decoder and/or encoder according to the present application may be implemented in a number of computing devices, including, without limitation, servers, suitably programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

In an aspect of the present invention, a method for encoding a point cloud is provided to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, comprising the steps:

Determining a coding mode;

Obtaining coding context information for a present child node; and

Entropy encoding the occupancy of the present child node based on the determined coding context information to produce encoded data for the bitstream.

Preferably, the coding mode includes Planar Coding Mode and/or Angular Coding Mode.

Preferably, wherein if the coding mode is the planar coding mode, coding context information includes planar context information.

Preferably, wherein planar context information of the present child node is determined according to the occupancy pattern of the present parent node and the occupancy pattern of at least one neighboring parent node positioned directly next to the present parent node Preferably, wherein if the coding mode is the angular coding mode, the coding context information of a present child node includes planar information of the present parent node and the occupancy of the vertical parent neighbor adjacent to the present parent node.

In an aspect of the present invention, a method for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, comprising the steps:

Determining a coding mode;

Obtaining coding context information for a present child node; and

Entropy decoding the bitstream based on the context information of the present child node to reconstruct the point cloud.

Preferably, the coding mode includes Planar Coding Mode and/or Angular Coding Mode.

Preferably, wherein if the coding mode is the planar coding mode, coding context information includes planar context information.

Preferably, wherein planar context information of the present child node is determined according to the occupancy pattern of the present parent node and the occupancy pattern of at least one neighboring parent node positioned directly next to the present parent node Preferably, wherein if the coding mode is the angular coding mode, the coding context information of a present child node includes planar information of the present parent node and the occupancy of the vertical parent neighbor adjacent to the present parent node.

Certain adaptations and modifications of the described embodiments can be made. Therefore, the above discussed embodiments are considered to be illustrative and not restrictive. In particular, embodiments can be freely combined with each other.

The invention claimed is:

1. A method for encoding a point cloud to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, the method comprising:

determining a coding mode, wherein the coding mode includes a planar coding mode and an angular coding mode;

obtaining coding context information for a present child node, wherein if the coding mode is the planar coding mode, the coding context information includes planar context information and plane position context information of the present child node, wherein the planar context information is determined according to an occupancy pattern of a present parent node and an occupancy pattern of at least one neighboring parent node positioned directly next to the present parent node, wherein for determining the planar context information and the plane position context information according to the occupancy pattern of at least one neighboring parent node, a present plane position of the present child node relative to the present parent node is determined, wherein the present plane position includes a high plane position and a low plane position, wherein if the present plane position is the low plane position, the planar context information and the plane position context information are determined according to an occupancy of a first group of four child nodes of the neighboring parent node that are directly next to the present parent node and an occupancy of a second group of four child nodes of the present parent node directly opposite the first group; and if the coding mode is the angular coding mode, the coding context information includes planar information of the present parent node and occupancy of a vertical neighboring parent node adjacent to the present parent node; and entropy encoding the present child node based on the obtained coding context information to produce encoded data for the bitstream.

2. The method according to claim 1, wherein the plane position context information includes one or more of:
a distance d from a closest already coded node at a same coordinate in a respective parent node and a same depth D in the octree-based structure;
a plane position of the closest already coded node at the same coordinate in the respective parent node and the same depth D in the octree-based structure; and
a plane position of the present child node according to the occupancy pattern of at least one neighboring parent node positioned directly next to the present parent node.

3. The method according to claim 2, wherein if the closest already coded node at the same coordinate in the respective parent node and the same depth D in the octree-based structure is non-existent, the plane position context information only includes the plane position of the present child node according to the occupancy pattern of at least one neighboring parent node positioned directly next to the present parent node.

4. The method according to claim 2, wherein if the coding mode is the angular coding mode and the present child node is not eligible for the angular coding mode, the coding context information includes the plane position context information.

5. The method according to claim 1, wherein:
if at least one child node of the first group is occupied and the second group is not occupied, the planar context information includes a likelihood of a plane and the plane position context information includes a likelihood of a low plane position; or
if the first group is not occupied and at least one child node of the second group is occupied, the planar context information includes a likelihood of a plane and the plane position context information includes a likelihood of a high plane position; or
if the first group is not occupied and the second group is not occupied, the planar context information includes a likelihood of a plane, wherein the plane position context information includes a likelihood of a low plane, if at least one or more child nodes in the neighboring parent node are occupied which do not belong to the first group; or
if at least one child node of the first group is occupied and at least one child node of the second group is occupied and #FirstGroup>#SecondGroup+1, the planar context information includes a likelihood of a plane and the plane position context information includes a likelihood of a low plane position; or
if at least one child node of the first group is occupied and at least one child node of the second group is occupied and #FirstGroup<#SecondGroup+1, the planar context information includes a likelihood of a plane and the plane position context information includes a likelihood of a high plane position;

wherein #FirstGroup indicates a number of occupied child nodes in the first group and #SecondGroup indicates a number of occupied child nodes in the second group.

6. The method according to claim 1, wherein if the present plane position is high, the planar context information and the plane position context information are determined according to an occupancy of the neighboring parent node that is along an axis directly after the present parent node, and an occupancy of a group of four child nodes of the present parent node in a plane directly perpendicular to the axis and next to the present child node.

7. The method according to claim 6, wherein:
if at least one child node of the group is occupied and the neighboring parent node is not occupied, the planar context information includes a likelihood of a plane and the plane position context information includes a likelihood of a low plane position; or
if the group is not occupied and the neighboring parent node is occupied, the planar context information includes a likelihood of a plane and the plane position context information includes a likelihood of a high plane position; or
if the group is not occupied and the neighboring parent node is not occupied, the planar context information includes a likelihood of a plane, wherein the plane position context information includes a likelihood of a low plane, if one or more child nodes in a neighboring parent node along the axis directly before the present parent node are occupied; or
if at least one child node of the group is occupied and the neighboring parent node is occupied and #Group>2, the planar context information includes a likelihood of a plane and the plane position context information includes a likelihood of a low plane position; or
if at least one child node of the group is occupied and the neighboring parent node is occupied and #Group<2, the planar context information includes a likelihood of a plane and the plane position context information includes a likelihood of a high plane position; or
if at least one child node of the group is occupied and the neighboring parent node is occupied and #Group=2, the planar context information includes a likelihood of absence of a plane and the plane position is inferred to be unknown;

wherein #Group indicates the number of occupied nodes in the group.

8. The method according to claim 1, wherein the neighboring parent node is arranged along one of geometrical axes.

9. The method according to claim 1, wherein the coding context information is determined along all three geometrical axes.

10. A method for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, the method comprising:
determining a coding mode, wherein the coding mode includes a planar coding mode and an angular coding mode;
obtaining coding context information for a present child node, wherein if the coding mode is the planar coding mode, the coding context information includes planar context information and plane position context information of the present child node, wherein the planar context information is determined according to an occupancy pattern of a present parent node and an occupancy pattern of at least one neighboring parent node positioned directly next to the present parent node, wherein for determining the planar context information and the plane position context information according to the occupancy pattern of at least one neighboring parent node, a present plane position of the present child node relative to the present parent node is determined, wherein the present plane position includes a high plane position and a low plane position, wherein if the present plane position is the low plane position, the planar context information and the plane position context information are determined according to an occupancy of a first group of four child nodes of the neighboring parent node that are directly next to the present parent node and an occupancy of a second group of four child nodes of the present parent node directly opposite the first group;

if the coding mode is the angular coding mode, the coding context information includes planar information of the present parent node and occupancy of a vertical neighboring parent node adjacent to the present parent node; and entropy decoding the bitstream based on the obtained coding context information of the present child node to reconstruct the point cloud.

11. The method according to claim 10, wherein the plane position context information includes one or more of:
a distance d from a closest already coded node at a same coordinate in a respective parent node and a same depth D in the octree-based structure;
a plane position of the closest already coded node at the same coordinate in the respective parent node and the same depth D in the octree-based structure; and
a plane position of the present child node according to the occupancy pattern of at least one neighboring parent node positioned directly next to the present parent node.

12. The method according to claim 11, wherein if the closest already coded node at the same coordinate in the respective parent node and the same depth D in the octree-based structure is non-existent, the plane position context information only includes the plane position of the present child node according to the occupancy pattern of at least one neighboring parent node positioned directly next to the present parent node.

13. The method according to claim 11, wherein if the coding mode is the angular coding mode and the present child node is not eligible for the angular coding mode, the coding context information includes the plane position context information.

14. The method according to claim 10, wherein:
if at least one child node of the first group is occupied and the second group is not occupied, the planar context information includes a likelihood of a plane and the plane position context information includes a likelihood of a low plane position; or
if the first group is not occupied and at least one child node of the second group is occupied, the planar context information includes a likelihood of a plane and the plane position context information includes a likelihood of a high plane position; or
if the first group is not occupied and the second group is not occupied, the planar context information includes a likelihood of a plane, wherein the plane position context information includes a likelihood of a low plane, if at least one or more child nodes in the neighboring parent node are occupied which do not belong to the first group; or
if at least one child node of the first group is occupied and at least one child node of the second group is occupied and #FirstGroup>#SecondGroup+1, the planar context information includes a likelihood of a plane and the plane position context information includes a likelihood of a low plane position; or
if at least one child node of the first group is occupied and at least one child node of the second group is occupied and #FirstGroup<#SecondGroup+1, the planar context information includes a likelihood of a plane and the plane position context information includes a likelihood of a high plane position;
wherein #FirstGroup indicates a number of occupied child nodes in the first group and #SecondGroup indicates a number of occupied child nodes in the second group.

15. The method according to claim 10, wherein if the present plane position is high, the planar context information and the plane position context information are determined according to an occupancy of the neighboring parent node that is along an axis directly after the present parent node, and an occupancy of a group of four child nodes of the present parent node in a plane directly perpendicular to the axis and next to the present child node.

16. The method according to claim 15, wherein:
if at least one child node of the group is occupied and the neighboring parent node is not occupied, the planar context information includes a likelihood of a plane and the plane position context information includes a likelihood of a low plane position; or
if the group is not occupied and the neighboring parent node is occupied, the planar context information includes a likelihood of a plane and the plane position context information includes a likelihood of a high plane position; or
if the group is not occupied and the neighboring parent node is not occupied, the planar context information includes a likelihood of a plane, wherein the plane position context information includes a likelihood of a low plane, if one or more child nodes in a neighboring parent node along the axis directly before the present parent node are occupied; or
if at least one child node of the group is occupied and the neighboring parent node is occupied and #Group>2, the planar context information includes a likelihood of a plane and the plane position context information includes a likelihood of a low plane position; or
if at least one child node of the group is occupied and the neighboring parent node is occupied and #Group<2, the planar context information includes a likelihood of a plane and the plane position context information includes a likelihood of a high plane position; or
if at least one child node of the group is occupied and the neighboring parent node is occupied and #Group=2, the planar context information includes a likelihood of absence of a plane and the plane position is inferred to be unknown;
wherein #Group indicates the number of occupied nodes in the group.

17. The method according to claim 10, wherein the neighboring parent node is arranged along one of geometrical axes.

18. The method according to claim 10, wherein the coding context information is determined along all three geometrical axes.

19. An encoder for encoding a point cloud to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, the encoder comprising:
- a processor and
- a memory storage device storing instructions executable by the processor,
- wherein the processor is configured to:
- determine a coding mode, wherein the coding mode includes a planar coding mode and an angular coding mode;
- obtain coding context information for a present child node, wherein
  - if the coding mode is the planar coding mode, the coding context information includes planar context information and plane position context information of the present child node, wherein the planar context information is determined according to an occupancy pattern of a present parent node and an occupancy pattern of at least one neighboring parent node positioned directly next to the present parent node, wherein for determining the planar context information and the plane position context information according to the occupancy pattern of at least one neighboring parent node, a present plane position of the present child node relative to the present parent node is determined, wherein the present plane position includes a high plane position and a low plane position, wherein if the present plane position is the low plane position, the planar context information and the plane position context information are determined according to an occupancy of a first group of four child nodes of the neighboring parent node that are directly next to the present parent node and an occupancy of a second group of four child nodes of the present parent node directly opposite the first group; and
  - if the coding mode is the angular coding mode, the coding context information includes planar information of the present parent node and occupancy of a vertical neighboring parent node adjacent to the present parent node; and
- entropy encoding the present child node based on the obtained coding context information to produce encoded data for the bitstream.

20. A decoder for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, the decoder comprising:
- a processor and
- a memory storage device storing instructions executable by the processor,
- wherein the processor is configured to:
- determine a coding mode, wherein the coding mode includes a planar coding mode and an angular coding mode;
- obtain coding context information for a present child node, wherein
  - if the coding mode is the planar coding mode, the coding context information includes planar context information and plane position context information of the present child node, wherein the planar context information is determined according to an occupancy pattern of a present parent node and an occupancy pattern of at least one neighboring parent node positioned directly next to the present parent node, wherein for determining the planar context information and the plane position context information according to the occupancy pattern of at least one neighboring parent node, a present plane position of the present child node relative to the present parent node is determined, wherein the present plane position includes a high plane position and a low plane position, wherein if the present plane position is the low plane position, the planar context information and the plane position context information are determined according to an occupancy of a first group of four child nodes of the neighboring parent node that are directly next to the present parent node and an occupancy of a second group of four child nodes of the present parent node directly opposite the first group;
  - if the coding mode is the angular coding mode, the coding context information includes planar information of the present parent node and occupancy of a vertical neighboring parent node adjacent to the present parent node; and
- entropy decoding the bitstream based on the obtained coding context information of the present child node to reconstruct the point cloud.

* * * * *